(12) United States Patent
Rollé

(10) Patent No.: US 8,019,769 B2
(45) Date of Patent: Sep. 13, 2011

(54) SYSTEM AND METHOD FOR DETERMINING VALID CITATION PATTERNS IN ELECTRONIC DOCUMENTS

(75) Inventor: Tony Rollé, New York, NY (US)

(73) Assignee: Litera Corp., McLeansville, NC (US)

( * ) Notice: Subject to any disclaimer, the term of this patent is extended or adjusted under 35 U.S.C. 154(b) by 437 days.

(21) Appl. No.: 12/016,391

(22) Filed: Jan. 18, 2008

(65) Prior Publication Data

US 2009/0187567 A1     Jul. 23, 2009

(51) Int. Cl.
 *G06F 7/00* (2006.01)
 *G06F 17/30* (2006.01)
(52) U.S. Cl. ........ 707/755; 707/776; 707/780; 707/917; 707/942
(58) Field of Classification Search .................. 707/705, 707/706, 741, 747, 755, 758, 769, 776, 780, 707/917, 923, 942
 See application file for complete search history.

(56) References Cited

U.S. PATENT DOCUMENTS

| | | | | |
|---|---|---|---|---|
| 5,097,418 A | * | 3/1992 | Nurse et al. | 715/207 |
| 5,794,236 A | * | 8/1998 | Mehrle | 707/5 |
| 7,003,719 B1 | | 2/2006 | Rosenoff et al. | |
| 7,028,259 B1 | | 4/2006 | Jacobson | |
| 7,529,756 B1 | * | 5/2009 | Haschart et al. | 707/100 |
| 2005/0108630 A1 | * | 5/2005 | Wasson et al. | 715/513 |
| 2007/0016848 A1 | | 1/2007 | Rosenoff et al. | |
| 2008/0178077 A1 | * | 7/2008 | Boucher | 715/266 |
| 2009/0150827 A1 | * | 6/2009 | Meyer et al. | 715/810 |

OTHER PUBLICATIONS

Microsoft Office XP Business Solution, West Group Uses Smart Tags to Dramatically Speed Up the Time it Takes Legal Researchers to Find and Cite Relevant Legal Information, published Mar. 2001.
2007 Microsoft Corporation, http://msdn2.microsfot.com/en-us/office/aa905529(printer).aspx.
Ben Waldron, MSDN Magazine, Realize the Potential of Office 2003 by Creating Tags in Managed Code, Feb. 2005, http://msdn.microsoft.com/msdnmag/issues/05/02/ManagedSmartTags/defautl.asp.
Regular Expression Syntax, printed from <http://developer.gimp.org/api/2.0/glib/glib-regex-syntax.html>, copyright 1997, University of Cambridge, 30 pages.
Rad Software, Custom Software Development, printed from http://www.radsoftware.com.au/articles/regexlearnsyntax.aspx, copyright 2004, Ross Donald, 7 pages.

(Continued)

*Primary Examiner* — Marc Somers
(74) *Attorney, Agent, or Firm* — Pillsbury Winthrop Shaw Pittman LLP

(57) ABSTRACT

A system and method are provided for comparing portions of document text with potential citation components, determining if individual portions correspond to a citation component, and determining if a set of portions correspond to a valid citation pattern. A set of valid citation patterns is provided. Each citation pattern may include a specified combination of citation components. The invention further relates to identifying potential citation components from text in a document, analyzing a pattern of the identified citation components by comparing the pattern to a set of stored citation patterns to determine if the potential citation is a type of citation, and if so, is it a valid (and/or invalid) citation pattern. Once citation patterns have been determined in the document, annotations may be inserted into the document, and subsequent action may be taken, for example, generating a list of citations, providing research services, error-handling, and/or providing other options related to the citations.

21 Claims, 16 Drawing Sheets

OTHER PUBLICATIONS

J. D. Meier et al., "How to: Use Regular Expressions to Constrain Input in ASP.NET", Microsoft Patterns & Practices, printed from http://msdn.microsoft.com/en-us/library/ff650303(d=printer ).aspx Microsoft Corporation, May 2005, 6 pages.

"Regular Expression" from Wikipedia, the free encyclopedia, printed from http//en.wikipedia.org/wiki/Regular_expression, last modified Jun. 9, 2010, 11 pages.

Richard Lowe, "Common Applications of Regular Expressions", printed from http://www.4guysfromrolla.com/webtech/120400-1.shtml, Dec. 4, 2000, 4 pages.

* cited by examiner

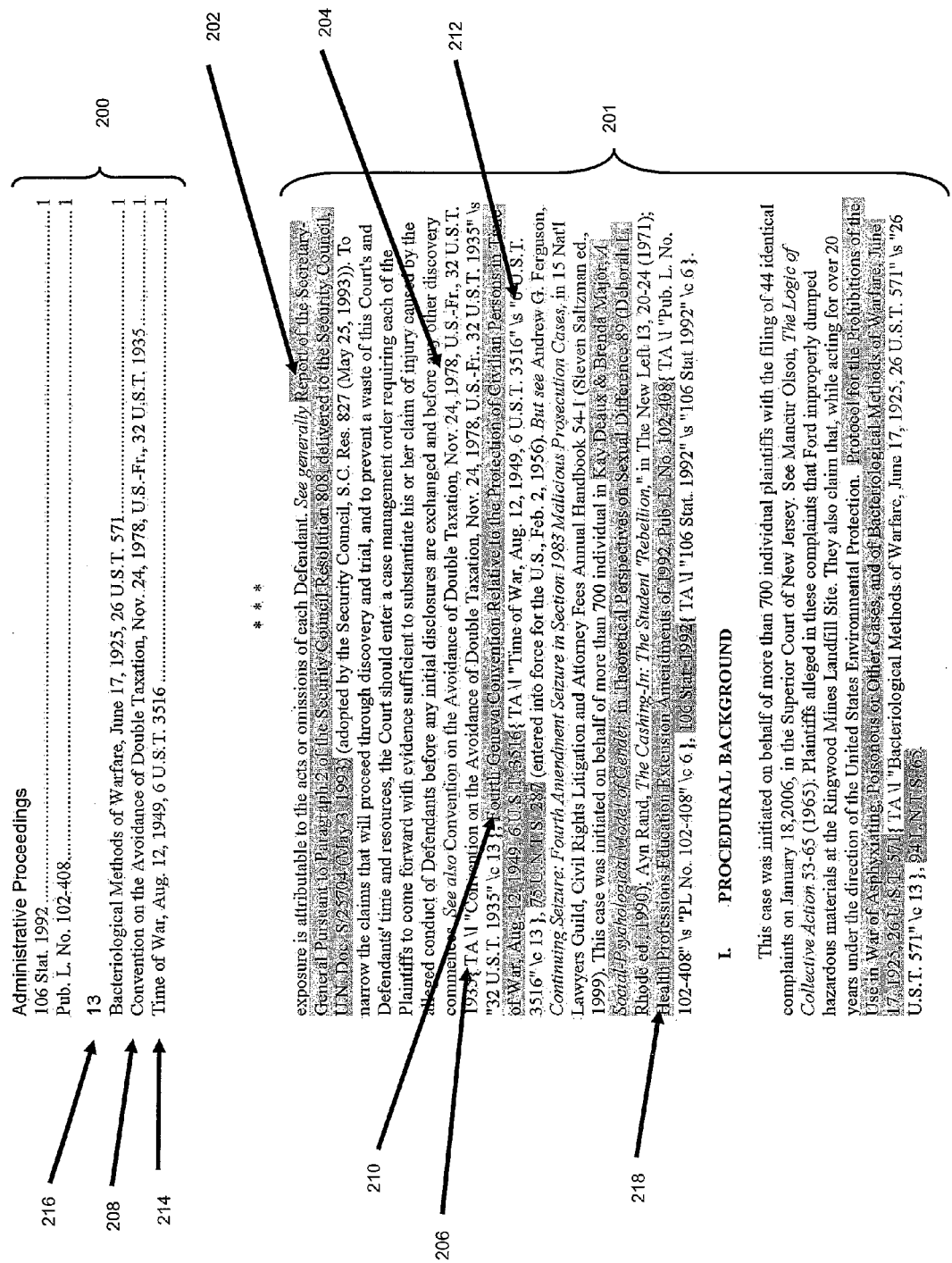
Figure 2 (CiteLink® – Prior Art)

TABLE OF AUTHORITIES

STATUTES

Health Professions Education Extension Amendments of 1992, Pub. L. No. 102-408, 106 Stat. 1992 .................................................................. 1

MISCELLANEOUS

Mancur Olson, *The Logic of Collective Action* 53-65 (1965) .................. 1

UNRECOGNIZED

The entries below, although they look like citations, could not be fully processed, since they did not contain any reporters built into the Full Authority dictionary.

6 U.S.T. 3516, 75 U.N.T.S. 287 ................................................ 1
32 U.S.T. 1935 ................................................................ 1
26 U.S.T. 571, 94 L.N.T.S. 65 ................................................ 1
Paragraph 2 ................................................................... 1
S.C. Res. 827 (May 25, 1993) ................................................. 1
*Section 1983* ............................................................... 1

Figure 3 (FullAuthority® – Prior Art)

(Best Authority®
– Prior Art)

Persons in Time of War, Aug. 12, 1949, { TA \xc <@opp> \xl 6 \s PBKMJH00006 \µ "6 U.S." }6 U.S.T. 3516, 75 U.N.T.S. { TA \xc <@leg> \xl 54 \s PBKMJH00001 \µ "S. 287 (entered into force for the U.S., Feb. 2, 1956)" }S. 287 (entered into force for the U.S., Feb. 2, 1956). *But see* { TA \xc <@con> \xl 108 \s PBKMJH00007 \µ "Andrew G. Ferguson, *Continuing Seizure: Fourth Amendment Seizure in Section 1983 Malicious Prosecution Cases*" }Andrew G. Ferguson, *Continuing Seizure: Fourth Amendment Seizure in Section 1983 Malicious Prosecution Cases*, in 15 Nat'l Lawyers Guild, Civil Rights Litigation and Attorney Fees Annual Handbook { TA \xc <@opp> \xl 32 \s PBKMJH00008 \µ "54-1 (Steven Saltzman ed., 1999)" }54-1 (Steven Saltzman ed., 1999). This case was initiated on behalf of more than 700 individual in { TA \xc <@nper> \xl 64 \s PBKMJH00009 \µ "Kay Deaux & Brenda Major, *A Social-Psychological Model of Gender*" }Kay Deaux & Brenda Major, *A Social-Psychological Model of Gender*, in Theoretical Perspectives on Sexual Difference 89 (Deborah L. Rhode ed., 1990); { TA \xc <@nper> \xl 50 \s PBKMJH00010 \µ "Ayn Rand, *The Cashing-In: The Student "Rebellion,"*" }Ayn Rand, *The Cashing-In: The Student "Rebellion,"* in The New Left 13, { TA \xc <@opp> \xl 12 \s PBKMJH00011 \µ "20-24 (1971)" }20-24 (1971)" { TA \xc <@st> \xl 35 \s PBKMJH00002 \µ "Pub. L. No. 102-408, 106 Stat. 1992" }Pub. L. No. 102-408, 106 Stat. 1992.

I. PROCEDURAL BACKGROUND

This case was initiated on behalf of more than 700 individual plaintiffs with the filing of 44 identical complaints on January 18, 2006, in the Superior Court of New Jersey. See { TA \xc <@nper> \xl 57 \s PBKMJH00012 \µ "Mancur Olson, *The Logic of Collective Action* 53-65 (1965)" }Mancur Olson, *The Logic of Collective Action* 53-65 (1965). Plaintiffs alleged in these complaints that Ford improperly dumped hazardous materials at the Ringwood Mines Landfill Site. They also claim that, while acting for over 20 years under the direction of the United States Environmental Protection. Prohibited for the Use In War of Asphyxiating, Poisonous or other Gases, and of Bacteriological Methods of Warfare, June 17, 1925, TA \xc <@opp> \xl 7 \s PBKMJH00013 \µ "26 U.S." "26 U.S.," 26 U.S.T. N.T. { TA \xc <@g> \xl 5 \s PBKMJH00003

Figure 4B
(Best Authority® – Prior Art)

800

| | Citation Component | Citation Component Criteria |
|---|---|---|
| 802 | Signal (not part of legal citation) | (?<Signal>[\w]ee (also,? [generally,? (e\.g\.,? )?)?(See,? )?[\w]\.g\.,? [[\w]ontra {1}][\w]ut (see(,?\se\.g\.,?)?\s*\|cf\.)?[\w\|f\.\|[\w]ompare \|[w]ccord )? |
| 803 | First party | (?<CaseName1>(?!\.\s{2})((\p{P})\s?\|of(,)? \|at(,)? \|by(,)? \|and(,)? \|or(,)? \|in(,)? \|art\. \|xvi\|XVI]*\|as(,)? \|for(,)? \|from(,)? \|the(,)? \|with(,)? \|on(,)? \|is(,)? \|a(,)? \|to(,)? \|it(,)? \|et al\.,? \|their(,)? \|para\. \|within(,)? \|into(,)? \|de \|ex rel\|van \|von \|pt(s)?\. )*\b[^\Wa-df-hj-z_\.][[^-A-Z\.&\id""]([?!\.\s{2}])?)*\b(\p{P}[a-z]*)*\s?)*(?=\s*\|(\|,\s+\|\.\|;\s*) |
| 804 | Versus | (\s*v\.\s) |
| 805 | Second party | (?<CaseName2>(?!No\.)((\p{P})\s?\|of(,)? \|at(,)? \|by(,)? \|& \|and(,)? \|or(,)? \|in(,)? \|art\. \|xvi\|XVI]*\|as(,)? \|for(,)? \|from(,)? \|the(,)? \|with(,)? \|on(,)? \|is(,)? \|a(,)? \|to(,)? \|it(,)? \|et al\.,? \|their(,)? \|para\. \|within(,)? \|into(,)? \|de \|ex rel\|van \|von \|pt(s)?\. )*\b(?!(Cases)?No\.)[^\Wa-df-hj-z_\id][[^\WA-Z0-9_\.\.]\|[-A-Z\.&\id,""]([?!\.\s{2}])?)*\b(\p{P}[a-z]*)*\s?)*(?=\s*\|(\|,\s+\|\.\|;\s*) |
| 806 | Docket number | (?<GenCaseDocketNo>\.*\s*((Cases)?No\.)\s*[-a-zA-Z0-9\is_\./*&\.]+(\|([a-zA-Z]*)?)?(?=\s*\|(\|,\s+\|\.\|;\s*) |
| 807 | Skeletal citation | (?<SkeletalCitation>\,\s+_*\s+[a-zA-Z0-9\.&_*\is]*\s+_*(?<Pinpoint>,\s+[-0-9]*)*\b[a-zA-Z\|p{S}\wW\|b)*],\s+(slip\|sop\.\s)?atls+[\d\s.\w,*-]*)?(?=\s*\|(\|,\s+\|d+)? |
| 808 | Reporter volume number | (?<RptrVol>,?\s?\d{1,4}\s+\|(?<LooseleafVol>\,?\s?[-\d\.a-zA-Z\p{Po}]*\s?\|\,\s+\|[[-a-zA-Z\d\s\.\p{Po}]*)?)?(?<Testing>(?!supra\|[da-zA-Z\.]*\sat\|sd*) |
| 809 | Reporter abbreviation | (?<RptrAbbre>[-a-zA-Z0-9_.*\s*&\|[\|]]*?\|sd*)? |
| 810 | Initial page | (?<InitialPage>[-0-9_*\|s*&\|[\|]*?\|sd*)? |
| 811 | Publishing service | (?<Publisher>[[A-Z][3,})\|\|(PIs*&\|s*F)\|(MB\|)\|(Univ\. Publ\. (Group\|Am\.)\|)\|(Aspen Law & Bus\|\.)\|(Envtl\. L\. Inst\|.))\|(ABA\|BNA))? |
| 812 | Initial subdivision | (?<InitialSubdivision>\s(([\xB6\|[\xA7\xB6])\{0,2\}\|No\.\|[\|w\|.]*)\s*[0-9\|\.-]*?[[a-zA-Z])\|)?(?<SubdivPinpoint>\s?at \[\|d-]*)? |
| 813 | Internet citation | (?<InternetCitation>(,\s*available atls*\|,\s*atls*\|,\s*)*<[-~/,.`%\|d\sA-Za-z_T*>)?(?=\s*\|(\|,\s+\|d*\|.\|\s*\|s*)(?<Pinpoint>,\s+[-0-9]*\b(?! at \|)\|)[a-zA-Z\|p{S}\wW &\|sd\|.]*?\|b)*],\s+(slip\|sop\.\s)?atls+[\d\s.\w,*-]*)?(?=\s*\|(\|,\s+\|d+)\|.) |
| 814 | Pinpoint | (?<Pinpoint>,\s+[-0-9]*\b(?! at \|)\|)[a-zA-Z\|p{S}\wW &\|sd\|.]*?\|b)*],\s+(slip\|sop\.\s)?atls+[\d\s.\w,*-]*)?(=\|s*\|(\|,\s+\|d+)\|.) |
| 815 | Reporter table | (?<ReporterTable>\s*\|(table))? |
| 816 | First parallel citation | (?<FirstParallelCitation>(\,\s+\|d+\|s+[a-zA-Z0-9.*\|s*]*)? |
| 817 | First parallel pinpoint | (?<ParaPinpoint1>,\s+[-0-9*]*\b[a-zA-Z\|p{S}\wW\|b)*],\s+atls+[\d\s.\w,*-]*)?(=\|s*\|(\|,\s+\|d+) |
| 818 | Second parallel citation | (?<SecParallelCitation>(\,*\s+\|d+\|s+[a-zA-Z0-9.*\s'-T*]?) |
| 819 | Second parallel pinpoint | (?<ParaPinpoint2>(,\s+(\\p{S})\|[(0-9*-]*)*],\s+atls+[\s,*\d]*)\|)?\s* |
| 820 | Early American citation | (?<EarlyAmericanCite>((\d+\sDall\.\|\d+\sCranch\|\d+\sWheat\.\|\d+\sPet\.\|\d+\sHow\.\|\d+\sBlack\|\d+\sWall\.))\sd+\s)? |
| 821 | Court and Date of decision | (?<CourtAndYear>\([^)]*)? |

Figure 8

| Citation Pattern | Citation Components |
|---|---|
| 902 General Legal Case | Signal (802), First party (803), Versus (804), Second party (805), Docket number (806), Skeletal citation (807), Reporter volume number (808), Reporter abbreviation (809), Initial page (810), Publishing service (811), Initial subdivision (812), Internet citation (813), pinpoint (814), Reporter table (815), First parallel citation (816), First parallel citation pinpoint (817), Second parallel pinpoint (818), Second parallel citation pinpoint (819), Early American citation (820), Court and date (821) |
| 903 Federal Statute | Name of Act, Title Number, Abbreviation of code cited, Section symbol and span of section containing statute, Date of code edition cited |
| 904 Federal Regulation | C.F.R title no., Abbreviation of set of regulation cited, Section symbol and specific section cited, Date of code edition cited |
| 905 Federal Rule | Abbreviation of set of rules cited, Number of rule cited |
| 906 Constitution | Abbreviation of constitution cited, Abbreviation for article, No. of amendment cited, Section symbol and No. of section cited |
| 907 Treaty | Name of Treaty, Abbreviated names of parties to agreement, Date of signing, U.S. treaty source |
| 908 Court Document | Common court and litigation documents |
| 909 Other Authority | Signal, Volume, Author (1st), Author (2nd), Title, Page cited, Parenthetical information, Publisher, Edition, Year |

900

Figure 9 of War," \c 9 }; *But see* Andrew G. Ferguson, *Continuing Seizure: Fourth Amendment Seizure in Section 1983 Malicious Prosecution Cases*, in 15 Nat'l Lawyers Guild, Civil Rights Litigation and Attorney Fees Annual Handbook 54-1 (Steven Saltzman ed., 1999){ TA \l "Andrew G. Ferguson, Continuing Seizure: Fourth Amendment Seizure in Section 1983 Malicious Prosecution Cases, in 15 Nat'l Lawyers Guild, Civil Rights Litigation and Attorney Fees Annual Handbook 54-1 (Steven Saltzman ed., 1999)" \s "Andrew G. Ferguson" \c 15 }. This case was initiated on behalf of more than 700 individual in Kay Deaux & Brenda Major, *A Social Psychological Model of Gender*, in Theoretical Perspectives on Sexual Difference 89 (Deborah L. Rhode ed., 1990){ TA \l "Kay Deaux & Brenda Major, A Social-Psychological Model of Gender, in Theoretical Perspectives on Sexual Difference 89 (Deborah L. Rhode ed., 1990)" \s "Kay Deaux & Brenda Major" \c 15 }; Ayn Rand, *The Cashing-In: The Student "Rebellion,"* in The New Left 13, 20-24 (1971){ TA \l "Ayn Rand, The Cashing-In: The Student \"Rebellion,\" in The New Left 13, 20-24 (1971)" \s "Ayn Rand" \c 15 }; Health Professions Education Amendments of 1992, Pub. L. No. 102-408, 106 Stat. 1992{ TA \l "Health Professions Education Amendments of 1992, Pub. L. No. 102-408, 106 Stat. 1992" \c 5 }.

I. PROCEDURAL BACKGROUND

This case was initiated on behalf of more than 700 individual plaintiffs with the filing of 44 identical complaints on January 18, 2006, in the Superior Court of New Jersey. See Mancur Olson, *The Logic of Collective Action* 53-65 (1965){ TA \l "Mancur Olson, The Logic of Collective Action 53-65 (1965)" \s "Mancur Olson" \c 15 }. Plaintiffs alleged in these complaints that Ford improperly dumped hazardous materials at the Ringwood Mines Landfill Site. They also claim that, while acting for over 20 years under the direction of the United States Environmental Protection. Protocol for the Prohibitions of the Use in War of Asphyxiating, Poisonous or Other Gases, and of Bacteriological Methods of Warfare, June 17, 1925, 26 U.S.T. 571, 94 L.N.T.S. 65{ TA \l "Protocol for the Prohibitions of the Use in War of Asphyxiating, Poisonous or Other Gases, and of Bacteriological Methods of Warfare, June 17, 1925, 26 U.S.T. 571, 94 L.N.T.S. 65" \s "Protocol for the Prohibitions of the Use in War of Asphyxiating, Poisonous or Other Gases, and of Bacteriological Methods of Warfare, June 17, 1925," \c 9 }.

Figure 14B

SYSTEM AND METHOD FOR DETERMINING VALID CITATION PATTERNS IN ELECTRONIC DOCUMENTS

FIELD OF INVENTION

The invention relates to a system and method for determining valid citation patterns in electronic documents.

BACKGROUND OF THE INVENTION

FIG. 1 is an exemplary illustration of a conventional legal case citation. A legal case citation may include a plurality of constituent components such as, for example: a first party field 102, a versus field 104, a second party field 106, a reporter volume number field 108, a reporter abbreviation field 110, an initial page 112 and a court and date of decision field 114.

Many times a list of the citations to authority appearing within a document is desired. The list of citations may include, for example, a Table of Authorities ("TOA"), endnotes, a bibliography, a table, a chart, a list, or other summarizing feature for citations. For example, most U.S. federal, state, and local courts, federal and state agencies, and other tribunals require briefs to include a Table of Authorities which is a table of cases, statutes and other authorities listed alphabetically with references to the pages of the brief where they are cited.

Various word processing applications, such as Microsoft Word®, have features that enable a user to manually mark citations found in the word processing document as a TA (Table of Authorities Entry) field code, and that automatically generate a TOA based on those codes. This process is often time consuming and error-prone, however, because it requires the person marking the document to not only have advanced knowledge of how to mark the document, but also to have familiarity with the myriad of rules and exceptions defined, for example, in the *The Bluebook: A Uniform System of Citation* or in other citation systems.

A number of commercially available software applications exist that enable a user to automatically generate a TOA for citations within an electronic document. In many such systems, a key-word searching mechanism is used to locate known reporters, jurisdiction or court clauses to identify citations in a document. U.S. Pat. Nos. 7,028,259 and 7,003,719, each of which is incorporated herein by reference in its entirety, describe known citation identification processes of this kind.

Several drawbacks may be associated with use of the known art. For example, the known algorithms usually require a legal citation software application to analyze each word in a document. Consequently, determining valid citations in the document may be time-consuming, depending on the length and complexity of the document. Additionally, key-word searching algorithms can become long, complicated, and difficult to maintain (especially if the original programmers are no longer available to consult on revisions). Hence, changes in the citation systems or in the programming language can result in extensive code changes. Moreover, the known algorithms may be written in a programming language that is specific to a certain platform and may not be easily portable to another platform (without incurring significant costs, for example, to rewrite code).

FIGS. 2-4 each illustrate examples of a TOA that may be generated by a commercially available software application. For ease of explanation, the TOA generated by each software application is located along the top portion of each figure (200, 300, 400). In FIGS. 2 and 4, following the three asterisks (in each figure) are two exemplary paragraphs of text in an electronic document, having actual legal citations contained therein (201, 401). These citations are shown, for clarity, in alternating shading colors.

FIG. 2 depicts a portion of an exemplary TOA 200 generated using CiteLink®, a software application marketed by West Publishing, for a legal document including the displayed text. Citation 202 is to a United Nations document. A review of the TOA 200 at the top of FIG. 2, however, shows that CiteLink® was unable to identify this as a citation. Citation 204 is to a treaty to which the United States is a party. Field Code 206 is an accompanying Microsoft Word® field code inserted by CiteLink®. Field Codes are normally used, for example, in generating the TOA. Referring to citation 208 in TOA 200, CiteLink® was apparently successful in recognizing the complete citation corresponding to citation 204 in the text 201. Citation 210 is to another treaty, in this instance the treaty title is fairly long. Field Code 212 is the accompanying Microsoft Word® field code inserted by CiteLink®. However, the corresponding citation 214 in the TOA 200 shows that CiteLink® was unable to recognize the full name of the treaty and is therefore incorrect. Continuing further, it is evident that many of the other citations in the document text (shown in FIG. 2) are either incomplete in (or missing from) TOA 200.

Moreover, CiteLink® has created an extraneous "13" category subheading 216, which appears to be an unnamed TOA category. It appears as though CiteLink® did not know what to name the category, so a default number was chosen. For example, Microsoft Word® (by default) contains sixteen TOA categories. All sixteen categories are numbered, with the first categories having common standard names (e.g., cases, statutes, etc). Further, the categories can have their names changed or names assigned to them. This can be done manually or in an automated fashion.

FIG. 3 depicts an exemplary TOA 300 (for the same text shown in FIG. 2) generated by FullAuthority®, a software application marketed by LexisNexis, using the "any reference" feature. In this figure, the document text portion is missing because FullAuthority® creates a stand-alone TOA, which is separate from the electronic document. In addition, no field codes are used in this process. The citation 302 in TOA 300 shows that FullAuthority® has correctly identified this citation to a session law corresponding to citation 218 in the document text (of FIG. 2). Citation 304 in TOA 300 also shows that FullAuthority® has correctly identified the citation to a book entitled "The Logic of Collective Action," in the document text (of FIG. 2). However, referring to the "UNRECOGNIZED" category subheading 306 of the TOA 300, there are a number of the citations contained therein that are either incomplete or missing.

FIG. 4A depicts an exemplary TOA 400 generated using Best Authority®, a software application marketed by Levitt & James, using Best Authority's "Basic Common" scheme with the "US and international cases" option checked for the Dictionary section. Citation 402 is the United Nations document referenced in the document text. Field Code 404 is the accompanying field code inserted by Best Authority®. Best Authority® inserts field codes that are modified Microsoft Word® field codes, which are proprietary, thus rendering these field codes unusable to second-party users not owning a version of Best Authority®. Referring to citation 406 in TOA 400, Best Authority® has recognized only a portion of the full name of citation 402 in the document text. Citation 408 is to a treaty to which the United States is a party. Field Code 410 is the accompanying proprietary field code inserted by Best Authority®. Referring to the "SUSPECTS" category subheading 420 of the TOA 400, for the citation 412 in the TOA 400, it can be seen that Best Authority® was only able to recognize "32 U.S.," while the remaining portion of the citation is missing. Finally, citation 414 (FIG. 4B) is to another treaty, and in this instance, the name of the treaty is rather long. According to field code 416 (FIG. 4B), Best Authority® was only able to recognize portions of the citation 414 (FIG. 4B), such portions being referred to by citations 418 in the TOA 400. Further study of FIGS. 4A and 4B shows that the many of the remaining citations are either incomplete or missing altogether.

In reviewing FIGS. 2-4, it is evident that the existing citation software applications lack a consistent level of accuracy, and completeness in recognizing and identifying various citations including, for example, lengthy and complex source strings for generating a list of citations.

SUMMARY OF INVENTION

The invention addressing these and other drawbacks of existing citation software applications relates to a system and method for comparing portions of document text with potential citation components, determining if individual portions correspond to a citation component, and determining if a set of portions correspond to a valid citation pattern.

According to one aspect of the invention, the system stores citation component criteria. For example, for each of a number of citation components, a set of citation component criteria may be provided. The citation component criteria may include various syntax rules and/or other criteria for identifying characteristics of a particular citation component. According to one aspect of the invention, regular expressions may be used to define syntax rules for characterizing a citation component. The regular expressions may include individual characters, sets or sequences of characters, strings, words, terms, expressions, and combinations thereof, for describing patterns of text in a document. Other tools and techniques may also be used.

According to one aspect of the invention, the system stores a set of valid citation patterns. Each citation pattern may include a specified combination of citation components, which together, define a pattern. According to one aspect of the invention, regular expressions may be used to define syntax rules for characterizing a citation pattern.

One aspect of the invention relates to identifying potential citation components from text in a document, analyzing a pattern of the identified citation components by comparing the pattern to the set of stored citation patterns to determine if the potential citation is a type of citation, and if so, is it a valid citation pattern. According to one implementation, the pattern analysis determines whether the identified citation components are ordered, associated, adjacent, juxtapose and/or otherwise related, in the manner according to one of the set of stored citation patterns. In some implementations, this may be a Boolean operation.

Once valid (and/or invalid) citation patterns have been identified in the document, annotations may be inserted into the document text, and subsequent action may be taken, for example, generating a list of citations, providing research services, error-handling, and/or providing other options related to citations.

According to one aspect of the invention, a software application may provide various modules for performing the above-mentioned tasks. The software application may include: a graphical user interface module; a storage module; a citation processing module that may further include a citation component identification module, a citation component pattern matching module and a short cite module; an annotation module, an action item module; a citation list generator module; and an interface module.

According to one aspect of the invention, the graphical user interface module controls the various display features of the application and allows the user to interact with the application using a computer.

According to one aspect of the invention, the storage module maintains the set of citation components along with their associated sets of citation component criteria. In addition, the storage module contains the set of citation patterns along with the associated set of citation components.

The citation processing module may include a citation component identification module to analyze text in a document and identify portions of text, which correspond to one or more stored citation components which may be found in the document. In addition, the citation processing module may include a citation component pattern matching module that analyzes a pattern of the identified citation components by comparing the pattern to a set of stored citation patterns to determine if the potential citation is a type of citation, and if so, is it a valid citation pattern.

According to one aspect of the invention, the citation processing module may maintain an index of the valid citation patterns determined in the text of the electronic document, along with information regarding "full cite" and "short cite" forms for each citation pattern therein. In some implementations, the index may include a single entry for each authority cited to in the document.

According to one aspect of the invention, the citation processing module may also include a short cite module which automatically generates one or more citation patterns corresponding to short cite forms for each valid citation pattern determined in the document text.

According to one aspect of the invention, an annotation module may be provided which generates computer readable indicators and/or visual indicators corresponding to portions of text determined to be valid (and/or invalid) citation patterns. One or more computer readable indicators, such as smart tags, field codes, TA (Table of Authorities) field codes, hidden codes, flags, or other indicators, may be used that signal to the software application that that portion of text is a valid citation pattern. Similarly, one or more visual indicators which may include a change of font (e.g., underlining, italics, size, font type, color, or other font parameter), an icon, a symbol and/or the presence or absence of other indicia that visually signal to a user that that portion of text is a valid (and/or invalid) citation type. In some implementations, a computer readable indicator and a visual indicator may be the same. Also, in some implementations, different indicators may be provided depending on the type of citation. In one implementation, the same indicator may be used for valid citation pattern corresponding to the same authority in order to signal to the application (and/or the user) that those citation patterns are related.

According to one aspect of the invention, an action item module may be provided that allows the user to select various options associated with each valid (and/or invalid) citation pattern. The options may be static, dynamic, or customized based on different citation types. In one implementation, an information icon, which provides a drop-down action menu when the uses clicks on or hovers over the icon, may be provided. Various options may be presented to the user within the drop-down action menu, according to the type of citation associated therewith. Such actions may include, but are not limited to, an option to link to an external website or to a commercial electronic database or research service such as LexisNexis, Westlaw, FindLaw, or LoisLaw. The actual document (e.g., a case, a statute, an article, or other source) that the citation refers to, or related documents may also be retrieved. Depending on type of citation, documents or information may be retrieved from different sources, for example, from free or proprietary services. In addition, legal professionals may be presented with an option to Shepardize the citation.

According to one aspect of the invention, the software application may also include a list generator module to generate a list of the valid citation patterns determined in the electronic document. The list of citations may include, for example, a Table of Authorities ("TOA"), endnotes, a bibliography, a table, a chart, a list, or other summarizing feature for citations. The list generator module may rely on the computer readable (or visual) indicators which were previously inserted by the annotation module and/or the index of citations maintained by the citation processing module, and/or the index of citations.

According to one aspect of the invention, an interface module may be provided to allow the software application to connect to various devices, as needed, thereby allowing the software application to transmit and/or receive information and data there between. The interface module may be configured to connect to external data sources. In one implementation, the interface module may connect via a network to a server, such as a third-party external server. A request to the electronic database or research service may be in the form of an electronic message to a third-party API (Application Programming Interface), for example, the LexisNexis Web Services Kit API. The request may be processed immediately by the service and a response message may be returned by the service. Returned documents or other results may be presented to the user by way of the interface display in an application, such as a research task pane within the document-processing software.

According to one aspect of the invention, a method is provided for determining valid citation patterns in an electronic document. First, the software application opens and/or processes an electronic document. A user may interact with the document through the graphical user interface module. The electronic documents may comprise documents generated by any of a number of software applications (e.g., word processing applications, spreadsheet applications, or other software applications).

Next, the citation processing module scans text in the electronic document and identifies portions of text, which correspond to one or more stored citation components which may be found in the document. The citation component identification module initially compares portions of text in the document against the set of stored citation component criteria, to determine potential citation components in the document text. Then, the citation component pattern matching module determines whether a pattern of the identified citation components matches a stored citation pattern. The pattern analysis determines whether the identified citation components are ordered, associated, adjacent, juxtapose and/or otherwise related, in a manner according to one of the stored citation patterns. In addition, the short cite module may automatically generate citation patterns for short cite forms for each valid citation pattern determined in the document text and determine short cite forms and id. (Ibid) recitations in the document text.

For those citations which are determined to be valid citation patterns, annotations may be inserted into the electronic document by the annotation module. The annotations signal to the software application (and/or the user) that one or more valid citation patterns are located in the document text. Each valid citation pattern may be individually identified in the document text. The annotation module may generate computer readable indicators and/or visual indicators corresponding to portions of text determined to be valid citation patterns. In some implementations, the annotation module may associate valid citation patterns, including those to short cites and id. recitations corresponding to the same authority.

Conversely, if a pattern of the identified set of citation components is not determined to be a valid citation pattern, but "appears" to correspond to a stored citation pattern (i.e., some, but not all of citation components of a particular citation pattern are satisfied), it may be flagged or otherwise identified by the annotation module, for possible error-handling.

According to one aspect of the invention, once valid (and/or invalid) citation patterns have been identified in the document text, subsequent action may be taken by the software application and/or the user. For example, the user may select various options and/or functions associated with each valid citation pattern. In one implementation, an information icon, which provides a drop-down action menu when the user clicks on or hovers over the icon, may be provided for each valid citation pattern in the document. Included in the drop-down menu may be options to link to an external website and services, to retrieve the actual document that the citation refers to, to Shepardize the citation, and/or other options related to citations.

According to one aspect of the invention, a list of citations may be generated and inserted within the document (or other location), automatically or at the direction of the user, by the list generator module. The user may select the location and the type of list to generate, for example, from a menu. The list of citations may include, for example, a table of Authorities ("TOA"), endnotes, a bibliography, a table, a chart, a list, or other summarizing feature for citations. Further, the user may choose to insert the list at the beginning, the end of document, or anywhere else in the document, that the user so desires. Alternatively, the software application may automatically generate the list of citations based on default parameters, when the user selects an option to do so. In generating a list of citations, the list generator module may rely on the computer readable indicators that were previously inserted by the annotation module and the index of valid citation patterns determined in the document.

According to one aspect of the invention, returned documents and/or other results may be presented or displayed to the user by way of the interface display in an application, such as in a research task pane within the document-processing software.

Other features and advantages of the invention will be apparent from the following detailed description and accompanying drawings, figures and the appended claims.

BRIEF DESCRIPTION OF THE DRAWINGS

FIG. 2 illustrates an exemplary Table or Authorities ("TOA") generated using the CiteLink® software application.

FIG. 3 illustrates an exemplary TOA generated using the FullAuthority® software application.

FIG. 4A-4B illustrate an exemplary TOA generated using the Best Authority® software application.

FIG. 8 illustrates how a set of citation component criteria may be used to identify a citation component, according to an aspect of the invention.

FIG. 9 illustrates how a set of citation components may be used to determine a citation pattern, according to an aspect of the invention.

FIGS. 14A-14B illustrate an exemplary list of citations generated by the application, according to one aspect of the invention.

DETAILED DESCRIPTION OF INVENTION

Figure 5:
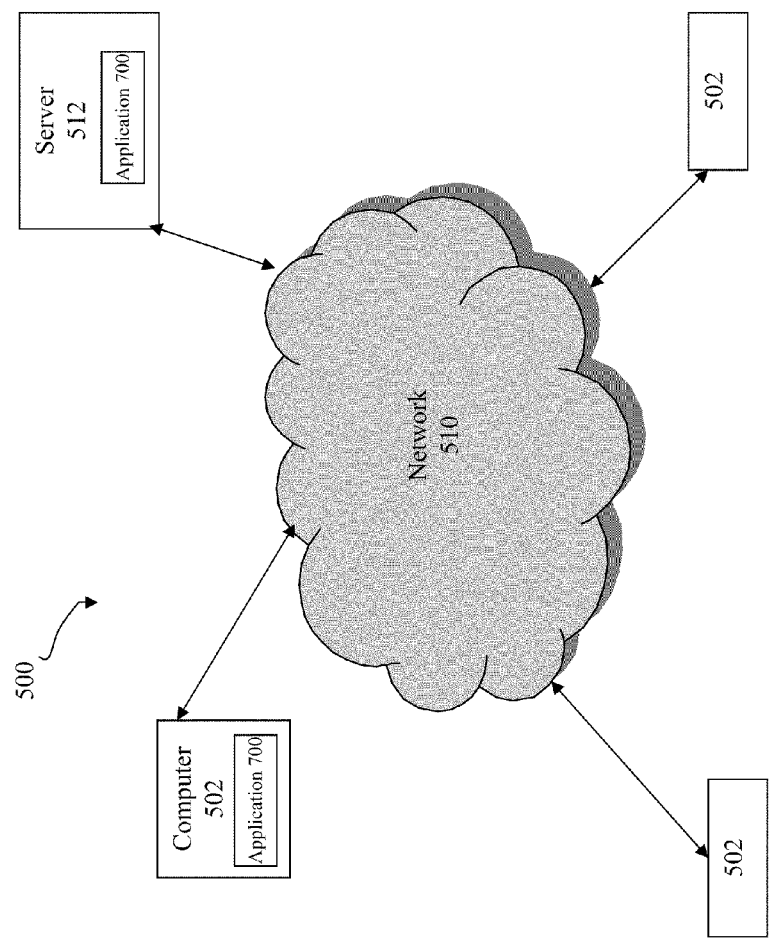
FIG. 5 illustrates an exemplary system architecture, according to one aspect of the invention.

According to an aspect of the invention, and with reference to FIG. 5, an exemplary system architecture 500 will first be described. In one implementation, a user may create, access, manipulate, or store one or more documents of varying file type via a computer 502. Computer 502 may comprise, but is not limited to, a desktop computer, portable computer (e.g., a laptop computer), Personal Digital Assistant (PDA), network-enabled appliance, or other device. According to one aspect of the invention, a software application 700 may be provided for determining valid citation patterns in electronic documents, which may be executed by a processor of computer 502.

Figure 6:
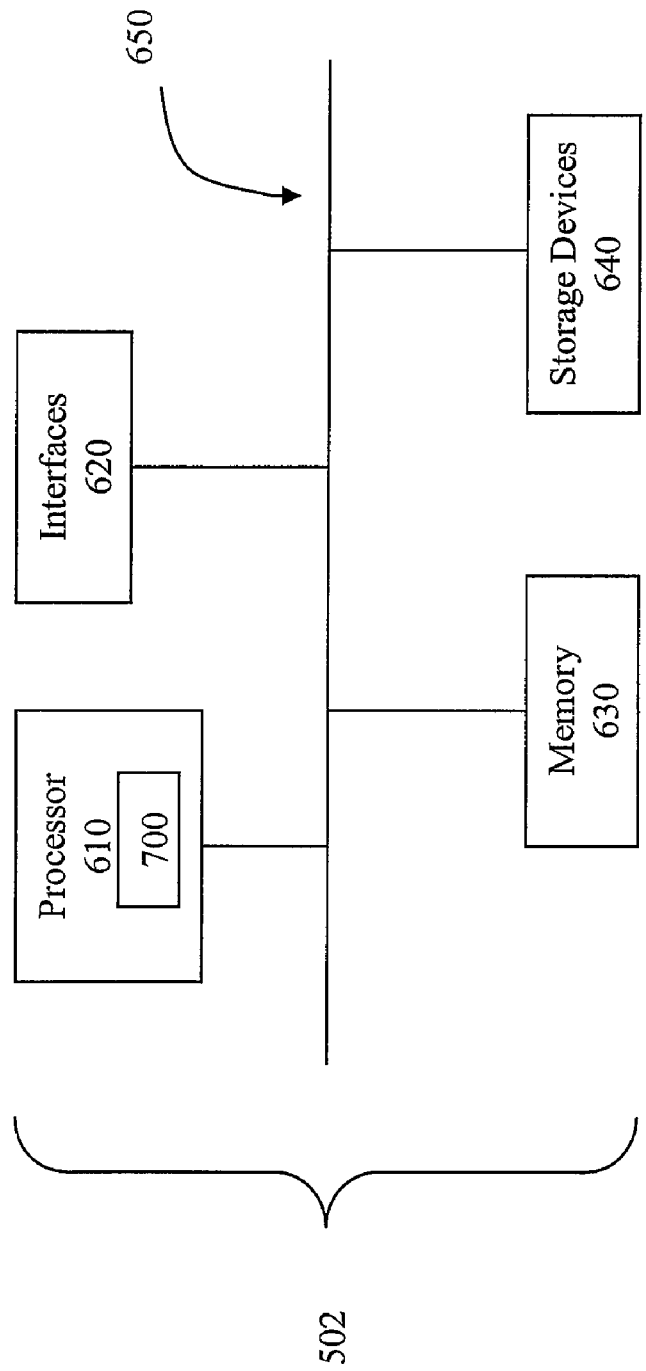
FIG. 6 is a schematic block diagram of a computer, according to one aspect of the invention.

In one implementation, and with reference to FIG. 6, computer 502 may comprise a processor 610, interfaces 620, memory 630, and storage devices 640 which are electrically coupled via bus 650. Memory 630 may comprise random access memory (RAM), read only memory (ROM), flash memory, or other memory, and may store computer-executable instructions to be executed by processor 610, as well as data which may be manipulated by processor 610. Storage devices 640 may comprise floppy disks, hard disks, optical disks, tapes, or other known storage mediums for storing computer-executable instructions and/or data. Interfaces 620 may comprise interfaces to various peripheral devices (e.g., a keyboard, a mouse, microphones, external storage devices, monitors, printers or other input and/or output devices as would be appreciated by those having skill in the art) as well as other components as described herein.

According to an aspect of the invention, a user may run any number of various types of software applications on computer 502. In some implementations, a user may utilize computer 502 to access any number of various types of software applications hosted, including application 700, for example, by one or more servers, such as server 512. In some implementations, computer 502 may be networked directly to server 512, or operatively connected to server 512 over a network 510, via a wired or wireless communications link. Network 510 may include any one or more of, for instance, the Internet, an intranet, a Personal Area Network (PAN), a Local Area Network (LAN), a Wide Area Network (WAN), a Storage Area Network (SAN), a Metropolitan Area Network (MAN), or other network. Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, wireless connection, or other connection. Although not illustrated, server 512 may comprise, include, and/or interface to one or more databases or other data storage or query formats, platforms, or resources for storing (and retrieving) various types of data.

Figure 7:
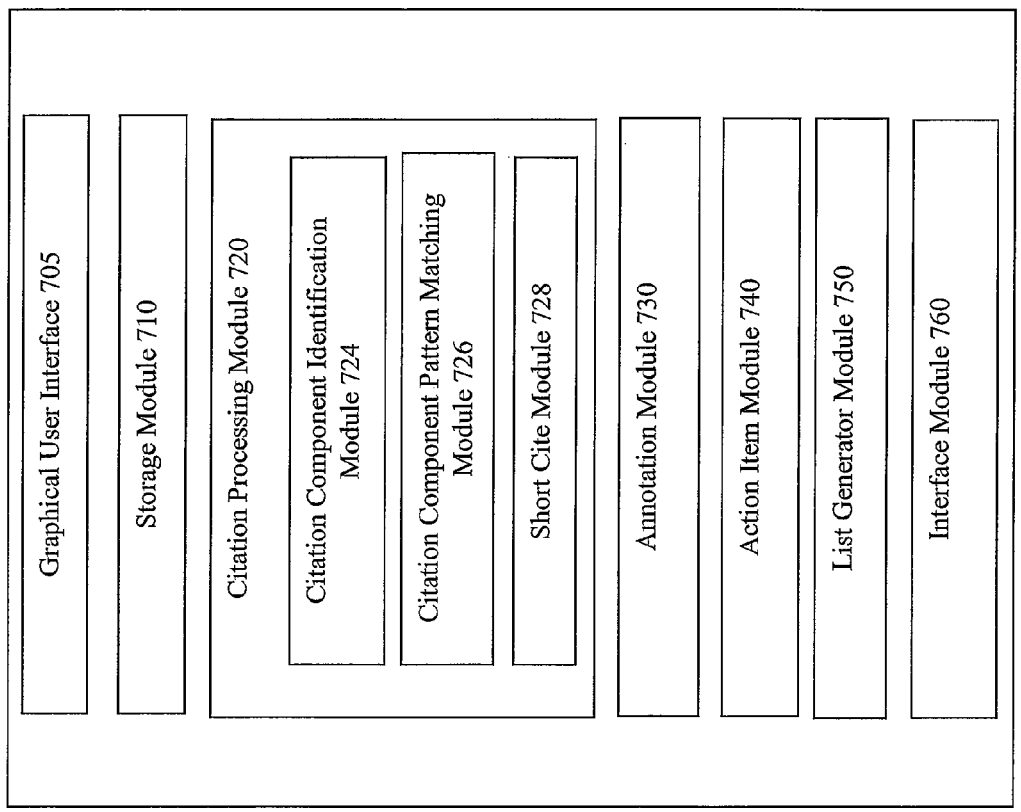
FIG. 7 is an exemplary illustration of a software application, according to one aspect of the invention.

According to an aspect of the invention, FIG. 7 shows a software application 700 that may be provided for determining valid citation patterns in electronic documents. The electronic documents may comprise documents associated with any number of software applications (e.g., word processing applications, html-editing applications, spreadsheet applications, presentation and development applications, web-browsing applications, or other software applications).

According to an aspect of the invention, and with reference to FIG. 7, application 700 may comprise one or more software modules that enable the various features and functionality of the invention. Non-limiting examples of the modules of application 700 may include: a graphical user interface module 705, a storage module 710, a citation processing module 720 which may further include a citation component identification module 724, a citation component pattern matching module 726 and a short cite module 728, an annotation module 730, an action item module 740, a citation list generator module 750, and an interface module 760.

One or more of the modules comprising application 700 may be combined. For some purposes, not all modules may be necessary.

According to an aspect of the invention, application 700 may be created using any number of programming languages including, but not limited to, Microsoft Visual Studio Tools for Office™ ("VSTO"), Visual Basic.Net, or Visual C#.Net. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

The graphical user interface module 705 controls the various display features of the application and allows the user to interact with the application using a computer 502. The graphical user interface module 705 may interact with the computer's operating system and/or one or more software applications. In one implementation, application 700 may comprise a stand-alone software application running on computer 502. Alternatively, server 512 may host application 700, thus requiring a user of computer 502 to access server 512 over network 510 to use the application. In some implementations, a user may download application 700 from server 512 to be run on computer 502, with program updates made available (over network 510) as needed, or on a predetermined, regularly-scheduled basis.

In an alternative implementation, application 700 may be a "plug-in" that is incorporated into a third-party software application including, for example, but not limited to, a word-processing application, a spreadsheet application, an HTML-editing application, a presentation and development application, or other application. The third-party software application may comprise an application running on computer 502, or an application hosted by (or downloaded from) server 512 (via network 510). Other configurations may be implemented.

According to one aspect of the invention, each citation pattern is composed of various citation components. For each of a number of citation components, a set of citation component criteria may be provided. According to one aspect of the invention, the citation components may be characterized according to stylistic rules and standards defined according to various systems of citation.

In one implementation, the application may be used with documents containing legal citations conforming to the stylistic rules and standards defined in past, present and future editions of *The Bluebook: A Uniform System of Citation* ("the Bluebook"), the Association of Legal Writing Directors Style Manual by Darby Dickerson ("ALWD"), the New York Law Reports Style Manual ("NYLR Style Manual"), the California Style Manual ("California Style Manual") by Robert E. Formichi and for any other legal citation style manuals approved or created by U.S. federal and state courts, agencies and other tribunals, university law reviews, and/or other entities. In addition to legal citations, the application is also applicable to other fields and endeavors where citations to authorities are customarily used (e.g., medical, business and finance, engineering and scientific fields, academia or education, or other professions).

While reference is made to the Bluebook herein, it will be appreciated that one or more citation systems may be similarly utilized, and that any reference herein to the Bluebook is exemplary only and should not be viewed as limiting.

According to one implementation, regular expressions may be used to define syntax rules for characterizing citation components and citation patterns. For example, several computer languages and utilities—including UNIX utilities, Perl, grep, .NET, and Java—recognize regular expressions (or "regex"). However, other tools and techniques may also be used.

Table 1 illustrates some regular expression syntaxes that may be used to define syntax rules for characterizing citation components, according to an aspect of the invention. The regular expressions may include individual characters, sets or sequences of characters, strings, words, terms, expressions, and combinations thereof, for describing patterns of text in a document.

TABLE 1

Common Syntaxes of Regular Expressions

| Syntax | Definition |
|---|---|
| \ | indicates next character should not be interpreted literally (general escape character) |
| ^ | beginning of input or line |
| $ | end of input or line |
| * | 0 or more instances of preceding character |
| + | 1 or more instances of preceding character |
| ? | 0 or 1 instance of preceding character |
| . | any single character other than the new line character |
| [ | start character class definition |
| \| | start alternate |
| ( | start of subpattern |
| { | Start minimum/maximum quantifier |
| (x) | x and remembers the match |
| x\|y | either x or y |
| {n} | exactly n instances of preceding character (where n is an integer) |
| {n,} | at least n instances of preceding character (where n is an integer) |

TABLE 1-continued

Common Syntaxes of Regular Expressions

| Syntax | Definition |
|---|---|
| {n,m} | at least n and at most m instances of preceding character (where n and m are integers) |
| [xyz] | any one of enclosed characters (specify range using hyphen, such as [0-9] |
| [^xyz] | any character not enclosed (specify range using hyphen, such as [^0-9] |
| [\b] | a backspace |
| \b | a word boundary, such as a space |
| \B | a non-word boundary |
| \cX | a control character, X |
| \d | a digit character (same as [0-9]) |
| \D | a non-digit character (same as [^0-9]) |
| \f | a form feed |
| \n | a line feed |
| \r | a carriage return |
| \s | a single white space character, including space, tab, form feed, and line feed (same as [\f\n\r\t\v]) |
| \S | a single non-white-space character (same as [^\f\n\r\t\v]) |
| \t | a tab |
| \v | a vertical tab |
| \w | any alphanumeric character, including the underscore (same as [A-Za-z0-9_]) |
| \W | any non-word character (same as [^A-Za-z0-9_]) |
| \n | a reference to the last substring matching the nth parenthetical (where n is a positive integer) |
| \ooctal | an octal or hexadecimal escape value |
| \xhex | (for embedding ASCII codes) |

According to one implementation, regular expressions may be created, for example, using VSTO, and known as a document-level customization. A document-level customization may comprise a managed code assembly that is attached, for example, to a Microsoft Word® document. Document-level customizations with VSTO, may be used, for example, according to "*Visual Studio Tools for Office: Using C# with Excel, Word, Outlook, and InfoPath*" by Eric Carter and Eric Lippert (Addison Wesley Professional, Sep. 8, 2005), the entirety herein incorporated by reference. The assembly may be linked or associated to the electronic document, but is stored separately, for instance in memory 630 or remotely on a server 512 or network drive. According to one implementation, a word-processing document may be linked with a managed code assembly that is compiled into a dynamic-link library (.dll) file by VSTO.

FIG. 8 shows, in one implementation, how the syntaxes in Table 1 may be used to create a set of citation component criteria for each of a plurality of citation components based on the current rules and standards as defined in the Bluebook for legal citations. It will be appreciated that many more syntax members exist other than those depicted in Table 1.

As previously mentioned, the citation components may be created for any desired citation format, and only a few possible examples are shown herein. According to one aspect of the invention, the set of citation component criteria may include various syntax rules and/or other criteria for identifying characteristics of a particular citation component. In FIG. 8, each of entries 802-821 in Table 800 denotes a citation component (first column) and its associated set of citation component criteria (second column). In some implementations each set of citation component criteria may have a header (e.g., "<Signal>" in entry 802) associated with it so that it may be individually referred to.

Different citation types may use different combinations of citation components. However, not every combination of components may be, in fact, a valid citation pattern.

According to one implementation, a basic legal case citation pattern may include, for example, a first party citation component, versus citation component, a second party citation component, a reporter volume citation component, a reporter abbreviation citation component, an initial page, and a court and date citation component, according to the Bluebook. (See FIG. 1). These components of a legal case citation may be reflected in the construction of a pattern of citation components.

Other components of a basic legal case citation which may be optional or supplemental in nature include, for example, a pinpoint page citation component, prior and subsequent history citation component, explanatory phrases citation component and weight of authority citation component. If one or more of the optional or supplemental legal citation components is/are present in the text of the electronic document, then the optional or supplemental legal citation component or components may be recognized by the relevant citation component criteria. However, if an optional or supplemental legal citation component or components is/are absent from the text of the electronic document, then a validly formed legal citation which contain any of the above-described components may still be deemed a valid legal citation pattern.

According to an aspect of the invention, and with reference to FIG. 8, entry 802 in Table 800 is an exemplary illustration of an introductory signal citation component. Introductory signals are typically used with legal citations to present authorities and show how the authorities relate to propositions referred to in textual statements within the citation. The introductory signal citation component may not form a part of a legal citation, but may be used in connection with legal citations, and may be helpful in identifying citation components. According to its citation component criteria, the introductory signal may include known introductory signals (e.g., see, compare, accord, etc.).

Entry 803 is an exemplary illustration of first party citation component using many of the syntaxes in Table 1. According to its citation component criteria, the first party may define a first party of a legal case as having one or more words beginning with initial capital letters or lower case letters, or numbers. This citation component criteria also denotes certain lower case articles and prepositions which are permitted to appear in a first party citation component 802.

Entry 804 is an exemplary illustration of a versus citation component using many of the syntaxes in Table 1. According to its citation component criteria, versus may define a versus field as having a space followed by the letter "v," followed by a period and a space.

Entry 805 is an exemplary illustration of a second party citation component using many of the syntaxes in Table 1. According to its citation component criteria, the second party may define a second party of a legal case as not beginning with the word "No.," followed by one or more words beginning with initial capital letters or lower case letters or numbers. This citation component criteria also denotes certain lower case articles and prepositions which may be permitted to appear in a first party field. In one implementation, this citation component criteria may include a construct which performs a "lookahead." A lookahead (which may be identified with the "?=pattern" syntax) effectively allows a regular expression to peek ahead at subsequent characters. In this case, the lookahead may check to determine if the next characters are: (1) a comma followed by a space, followed by one or more digits, (2) a period followed by one or more spaces, (3) a semi-colon followed by one or more spaces, or (4) one or more spaces.

Entry 806 is an exemplary illustration of a docket number citation component. According to its citation component criteria, the docket number may begin with either of the words "Case" or "No." followed by various combinations of spaces, characters and punctuation. This citation component may be optional or supplemental, in some implementations.

Entry 807 is an exemplary illustration of a skeletal citation component. According to its citation component criteria, the skeletal citation begins with a comma followed by a space, which in turn, is followed by zero or more underscores which are followed by various combinations of spaces, characters and punctuation. This citation component may be optional or supplemental, in some implementations.

Entry 808 is an exemplary illustration of a reporter volume citation component. According to its citation component criteria, the reporter volume citation component may comprise from one to four numbers followed by a space. This citation component may be optional or supplemental, in some implementations.

Entry 809 is an exemplary illustration of a reporter abbreviation citation component. According to its citation component criteria, a reporter abbreviation citation component may comprise any number of digits, large and small letters, spaces and punctuation marks followed by a space which is in turn followed by any number of digits, large and small letters, spaces and punctuation marks. This citation component may be optional or supplemental, in some implementations.

Entry 810 is an exemplary illustration of an initial page citation component. According to its citation component criteria, an initial page citation component may comprise any number of digits, large and small letters, spaces and punctuation marks followed by a space which is in turn followed by any number of digits, large and small letters, spaces and punctuation marks. This citation component may be optional or supplemental, in some implementations.

Entry 811 is an exemplary illustration of a publishing service citation component. According to its citation component criteria, the publishing service citation component begins with three or more capital letters in any combination enclosed by parentheses, followed by various combinations of spaces, characters and punctuation. This citation component may be optional or supplemental, in some implementations.

Entry 812 is an exemplary illustration of an initial subdivision citation component. According to its citation component criteria, the initial subdivision citation component begins with a space followed by zero (or more) section ("§") or paragraph ("¶")symbols, followed by various combinations of spaces, characters and punctuation. This citation component may be optional, in some implementations.

Entry 813 is an exemplary illustration of an Internet citation component. According to its citation component criteria, the Internet citation component may begin with a comma, space, and the words "available at," followed by various combinations of spaces, characters and punctuation. This citation component may be optional or supplemental, in some implementations.

Entry 814 is an exemplary illustration of a pinpoint citation component. According to its citation component criteria, the pinpoint citation component may begin with a comma, space, and is followed by various combinations of spaces, characters and punctuation. This citation component may be optional, in some implementations.

Entry 815 is an exemplary illustration of a reporter table citation component. According to its citation component criteria, the reporter table citation component may comprise the word "table" enclosed in parentheses. This citation component may be optional or supplemental, in some implementations.

Entry 816 is an exemplary illustration of a first parallel citation-citation component. According to its citation component criteria, the first parallel citation-citation component may comprise various combinations of spaces, characters and punctuation. This citation component may be optional, in some implementations.

Entry 817 is an exemplary illustration of a first parallel pinpoint citation component. According to its citation component criteria, the first parallel pinpoint citation component may begin with a comma, space, and is followed by various combinations of spaces, characters and punctuation. This citation component may be optional or supplemental, in some implementations.

Entry 818 is an exemplary illustration of a second parallel citation-citation component. According to its citation component criteria, the second parallel citation-citation component may comprise various combinations of spaces, characters and punctuation. This citation component may be optional or supplemental, in some implementations.

Entry 819 is an exemplary illustration of a second parallel pinpoint citation component. According to its citation component criteria, the second parallel pinpoint citation component may begin with a comma, space, and is followed by various combinations of spaces, characters and punctuation. This citation component may be optional or supplemental, in some implementations.

Entry 820 is an exemplary illustration of an early American citation-citation component. According to its citation component criteria, the early American citation-citation component may comprise the names of the editors who were responsible for compiling cases for publication along with various combinations of spaces, characters and punctuation. This citation component may be optional, in some implementations. This citation component may be optional or supplemental, in some implementations.

Entry 821 is an exemplary illustration of a court and date of decision citation component. According to its citation component criteria, a court and date of decision citation component begins with an opening parentheses, and is followed by any number of characters except a closing parentheses. This is in turn followed by a closing parentheses.

In one implementation, one or more of the citation components 802-821 form a citation pattern. Depending upon the specified combination of citation components, a citation pattern may become fairly extensive. Moreover, it will be appreciated that a citation pattern may not require all of the citation components in Table 800 (FIG. 8). In some implementations, one or more of the citation components may be optional or supplemental, used as alternatives, or may not even be used at all.

In some implementations, a citation component may be comprised of one or more other citation components. Likewise, a citation pattern may be comprised of one or more other citation patterns. Once created the citation components and citations patterns may be used again and again, in various ways by the application 700. In other implementations, breaking down citation components and/or citation patterns, into one or more smaller citation component and/or citation patterns, may be more efficient for pinpointing where the start of certain types of citations (e.g., citations to books, newspapers, law review articles, and other sources) begin.

According to an aspect of the invention, and with reference to FIG. 9, each citation pattern may include a specified combination of one or more citation components. In one implementation, each of entries 902-909 in Table 900 (FIG. 9) corresponds to a citation pattern (first column) and a specified set of citation components (second column).

According to one aspect of the invention, each citation pattern includes not only its constituent citation components, but it also defines a pattern of those citation components. In one implementation, the set of citation components define a particular pattern between ordered, adjacent, associated, juxtapose and/or otherwise related citation components that must occur in the text to have a valid citation pattern, for that type of citation. In some implementations, each citation pattern may be characterized by a regular expression, formed by combining the regular expressions corresponding to its constituent citation components into a single regular expression. For example, when combining regular expressions, each regular expression may be separated by parentheses (for denoting the start and end of a subpattern), and/or other regular expression syntaxes, as desired (e.g., a "?" before the parentheses may indicate that a citation component is optional or supplemental).

Entry 902 in Table 900 (FIG. 9) is an exemplary illustration of a General Legal Case citation pattern, which may include a set of citation components that would be used to cite a general legal case, for example, according to the rules of the Bluebook.

According to one implementation, a General Legal Case citation pattern 902 may include the following set of citation components: signal 802, first party 803, versus 804, second party 805, docket number 806, skeletal citation 807, reporter volume number 808, reporter abbreviation 809, initial page 810, publishing service 811, internet citation 813, pinpoint 814, reporter table 815, first parallel citation 816, first parallel citation pinpoint 817, second parallel pinpoint 818, second parallel citation pinpoint 819, early American citation 820, and court and date of decision 821.

Similarly, citation patterns corresponding to each of entries 903 to 908 in Table 900 (FIG. 9) may be similarly formed from sets of citation components, for example, according to the rules of the Bluebook and/or other citation systems.

Entry 903 is an exemplary illustration of a Federal Statute citation pattern, which may include a set of citation components corresponding, for example, to the name of the act, abbreviation of the code cited (e.g., "U.S.C."), section symbol and span of section containing statue, and the date of code edition cited.

Entry 904 is an exemplary illustration of a Federal Regulation citation pattern, which may include a set of citation components corresponding, for example, to the abbreviation for the regulations (e.g., "C.F.R.") title number, abbreviation of set of regulation cited, section symbol and specific section cited, and the date of code edition cited.

Entry 905 is an exemplary illustration of a Federal Rule citation pattern, which may include a set of citation components corresponding, for example, to the abbreviation of set of rules cited, and the number of rule cited.

Entry 906 is an exemplary illustration of a Constitution citation pattern, which may include a set of citation components corresponding, for example, to the abbreviation of the constitution cited, abbreviation for the article cited, number of amendment cited, section symbol, and number of section cited.

Entry 907 is an exemplary illustration of a Treaty citation pattern, which may include a set of citation components corresponding, for example, to the name of the treaty, abbreviated names of the parties to the agreement, date of signing, and the U.S. treaty source. In other implementations, the Treaty citation pattern may have citation component that have citation component criteria including the terms "treaty," "U.N.T.S.," "U.S.T." or other indicia of a treaty. In some implementations, the date of signing may be an optional citation component.

Entry 908 is an exemplary illustration of a Court Document citation pattern, which may include a single citation component having a set of citation component criteria corresponding, for example, to a common court and litigation document name, such as "affidavit," "brief," "deposition," "motion," "order," "transcript," "record," or other court documents, which may usually be enclosed in parentheses and/or followed by a period or semi-colon.

Entry 909 is an exemplary illustration of an Other Authority citation pattern which may include a set of citation components corresponding, for example, to a Signal, the Volume, Author ($1^{st}$), Author ($2^{nd}$), Title, Page cited, Parenthetical information, Publisher, Edition, and Year. In some implementations, multiple citation patterns may be used for one or more of books, newspapers, articles, and other sources, which may be more specific for each source.

In one implementation, the storage module 710 maintains one or more citation patterns along with their associated sets of citation components. The storage module 710 also maintains a set of citation component criteria for each citation component. Storage module 710 may include one or more separate files, tables, databases, or other electronic data storage means, maintained on one or more storage devices 640 of computer 502.

According to one aspect of the invention, the citation processing module 720 scans text in a document to determine potential citations therein. The citation processing module 720 may include a citation component identification module 724 that analyzes text in a document and identifies portions of text that correspond to one or more stored citation components which may be found in the document. In some implementations, the comparison may be a Boolean operation.

In one implementation, the citation component identification module 724 may begin at the first character of the document and continue character-by-character until the end of the document (along with footnotes, endnotes, tables and/or other portions of the document). In other implementations, the citation component identification module 724 may start at the end of the document and proceed to the beginning of the document or by some other scanning algorithm. According to one implementation, the portions of text which match the citation component criteria may be "marked" (or otherwise identified) in memory 630 as a citation component, and may further include an indication of the type of citation component.

According to one aspect of the invention, the citation processing module 720 may also include a citation component pattern matching module 726 that analyzes a pattern of the identified citation components (identified by the citation component identification module 724) by comparing the identified pattern to a set of stored citation patterns. In some implementations, the comparison may be a Boolean operation. According to one implementation, the identified citation components in the document text which match the stored citation pattern may be marked in memory 630 as a valid citation pattern and may further include an indication of the type of citation.

According to one aspect of the invention, the citation processing module 720 may also include a short cite module 728 for automatically generating a citation pattern for short cite forms for each valid citation pattern determined in the document text. For example, the Bluebook and many other citation systems refer to the first recitation to an authority as a "full cite" and permit using an abbreviated citation form or "short cite" form when subsequently referring to that authority.

According to one aspect of the invention, the citation processing module 720 may maintain an index of valid citation patterns determined in the document text, along with "full cite" and "short cite" forms for each citation pattern. In one implementation, the citation processing module 720 may utilize a hashtable for the index. A hashtable is a data structure which contains an array of values for each of the entries therein. Each entry in the index may correspond to an independent authority cited to in the document. For example, the citation processing module 720 may search the index with respect to valid citation patterns determined by the citation component pattern matching module 726 to determine whether the authority corresponding to that citation component has previously been indexed. If not, a new entry may be created. In some implementations, the citation processing module 720 may alert the user to multiple occurrences of the same "full cite" form in the document text.

With knowledge of the individual citation components for citation patterns, the short cite module 728 may automatically generate one or more citation patterns for short cite forms for each valid citation pattern determined in the document text, which may be added to the set of citation patterns. In some implementations, the citation patterns generated for short cite forms depend on the type of citation, according the Bluebook or other citation system.

According to one aspect of the invention, the set of citation patterns may also include a citation pattern for id. recitations. The Bluebook and other citation systems permit the use of "id." (Ibid) when citing to the immediate preceding authority. In one implementation, the citation pattern for id. recitations may include a single citation component having a set of citation component criteria corresponding, for example, to "id.," "Id.," "Ibid," or other citation terms for referring to the same authority, optionally followed by various digits, characters, punctuations and terminating in a period. In some implementations, citation patterns for short forms of a citation (once created) and id. recitations may be handled just like any other citation pattern and stored in storage module 710. In alternate implementations, they may be handled differently by the application.

The application, when implemented, for example, within Microsoft Word®, recognizes citations components and citation patterns within an electronic document. According to one implementation, VSTO includes a regular expression engine which may be utilized to match regular expressions with portion of document text. The VSTO procedure "GetRegexData," for example, may read in a regular expression, corresponding to the citation patterns and citation components, from the storage module 710 into the memory 630 and/or one or more storage devices 640 of the computer 502. VSTO performs matching in a top-to-bottom sequence. However, other regular expression engines may handle regular expressions in a different manner.

According to one implementation, the application may work in close cooperation with the Microsoft .NET Framework. In the Microsoft .NET Framework, regular expression support is provided by over half a dozen classes as part of the System.Text.RegularExpressions namespace. Three of these classes are illustrated in Table 2 below and may be utilized for tasks that involve regular expressions.

TABLE 2

| .Net classes that support regular expressions | |
|---|---|
| Class | Description |
| Regex | Represents a read-only regular expression and provides static methods for using regular expressions. |

TABLE 2-continued

.Net classes that support regular expressions

| Class | Description |
|---|---|
| Match | Represents the result of a matching operation (when a regular expression is applied to an input string). |
| MatchCollection | Represents a sequence of successful matching operations (for example, when a regular expression matches several substrings within the input string). |

In other implementations, the Match or MatchCollection classes do not need to be called directly by the programmer because the underlying VSTO architecture takes care of the pattern-matching. The programmer simply provides the regular expression and VSTO and .NET (which includes the regular expression engine) take care of matching text in the document with the regular expression.

Thus, instead of performing the known key-word searching algorithms, a one-to-one comparison between each citation component criteria and the document text is performed to identify relevant portions of text matching the one or more citation components. Similarly, the application analyzes a pattern of the identified citation components by comparing the pattern to one of more stored citation patterns.

Figure 10A:
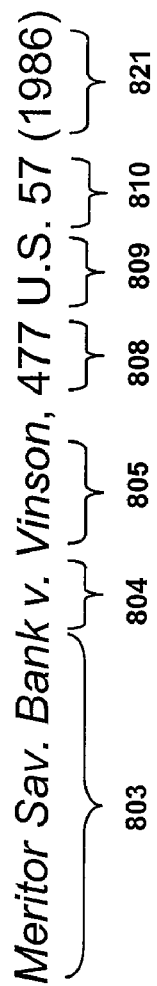
FIGS. 10A-10C illustrate three different exemplary legal case citations and how the citation components in FIG. 8 may correspond thereto.
Figure 10B:
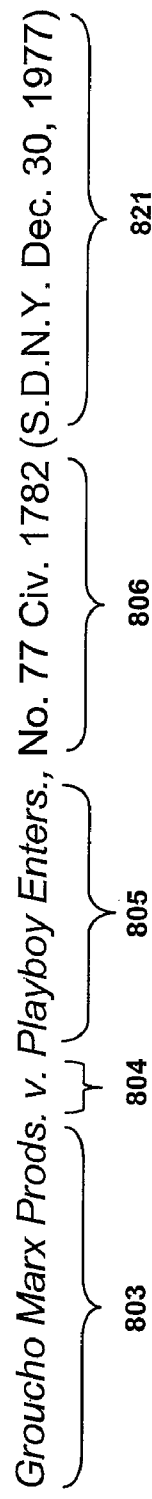
Figure 10C:
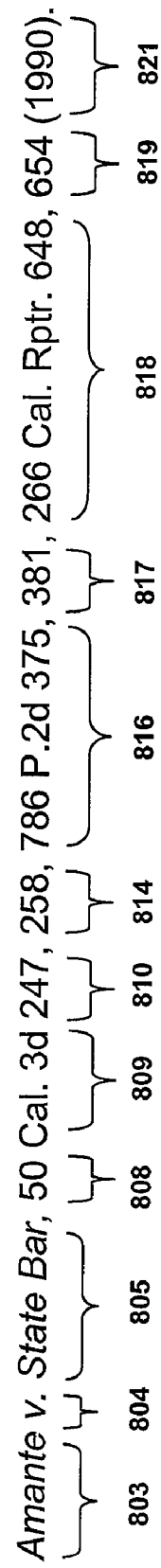

According to one aspect of the invention, and with reference to FIGS. 10A-10C, three exemplary legal case citations are shown along with how the citation components in FIG. 8, which define the General Legal Case citation pattern 902, may correspond thereto.

As illustrated in FIG. 10A, the citation components corresponding to the legal case citation *Meritor Sav. Bank v. Vinson,* 477 U.S. 57 (1986) satisfy the sets of citation component criteria for the citation components 803, 804, 805, 808, 809, 810 and 821. As will be appreciated, not each and every of the citation components 802-821 need to be matched. Indeed, some of the citation components may optionally be required, in accordance with rules of the Bluebook, as discussed above with respect to FIG. 8. Thus, whether the citation component criteria is present or not does not matter. In this non-limiting example, only the first party 803, versus 804, second party 805, and court and date of decision 821 citation components were required.

In FIG. 10B, the citation components corresponding to the legal case citation, *Groucho Marx Prods. v. Playboy Enters.,* No. 77 Civ. 1782 (S.D.N.Y. Dec. 30, 1977) satisfy the sets of citation component criteria for citation components 803, 804, 805, 806 and 821. This legal citation does not satisfy the set of citation component criteria for the optional reporter volume number citation component 808, reporter abbreviation 809 and initial page citation component 810, that were illustrated in FIG. 10A. However, as stated above, in this implementation, these citation components (808, 809, 810), are optional or supplemental, and thus, do not necessarily have to be present for determining a General Legal Case citation pattern 902.

FIG. 10C, illustrates yet another legal citation, *Amante v. State Bar,* 50 Cal. 3d 247, 258, 786 P.2d 375, 381, 266 Cal. Rptr. 648, 654 (1990), that further incorporates first and second parallel citation-citation components 814, 818. This legal citation satisfies the sets of citation component criteria for each of entries 803, 804, 805, 808, 809, 810, 814, 816, 817, 818, 819 and 821 in Table 800 (FIG. 8).

Each of the above examples shown in FIGS. 10A-10C, was determined to be a valid citation pattern, because their patterns of the identified set of citation components match the stored General Legal Case citation pattern 902.

Figure 1:
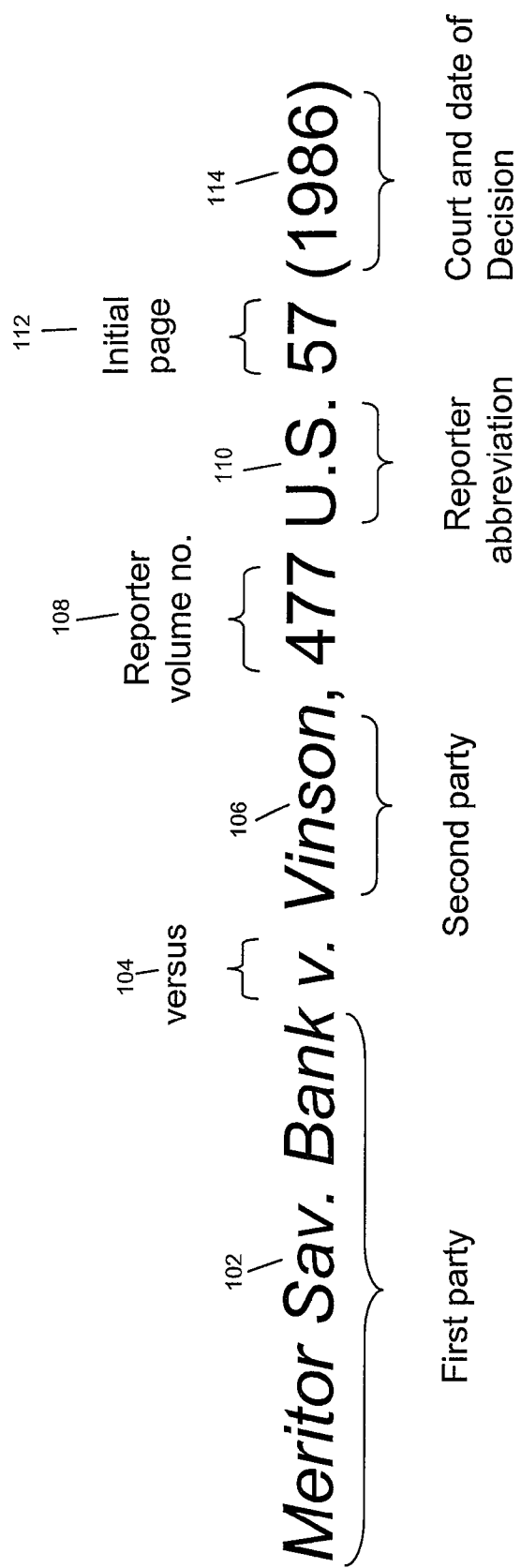
FIG. 1 is an exemplary illustration of an example of a basic legal case citation.

However, consider another example, in which the document text contains a malformed legal case citation, for example, *Meritor Sav. Bank v. Vinson,* 477 U.S. 57. In this example, citation components, for the first party 802, versus 803, the second party 804, the reporter volume number 808, the reporter abbreviation 809 and initial page 810 will be successfully identified. However, the court and date of decision field 114 in FIG. 1, is required according to the rules of the Bluebook, but is missing. Thus, no portion of this citation pattern will satisfy the set of citation component criteria for the court and date of decision citation component 821, and the pattern of the identified citation components does not match the General Legal Case citation pattern 902. As such, the portion of text corresponding to the pattern of the identified citation components will not be deemed a valid citation pattern for a General Legal Case citation pattern 902.

Thus, a required legal citation rule, in accordance with rules of the Bluebook or other citation system, may be enforced by using an appropriate set of citation component criteria for each citation component. As a result, malformed or invalid legal citation patterns in documents, which do not conform to the set of citation components for a particular citation pattern, may be ignored and/or error-handling may occur.

According to one aspect of the invention, the annotation module 730 may generate annotations corresponding to portions of text determined to be valid (and/or invalid) citation patterns. In one implementation, one or more computer readable indicators, such as smart tags, field codes, TOA (Table of Authorities) field codes, hidden codes, flags, or other indicators, may be used that signal to the software application that that portion of text is a valid citation pattern. Similarly, one or more visual indicators which may include a change of font (e.g., underlining, italics, size, font type, color, or other font parameter), an icon, a symbol and/or the presence or absence of other indicia that visually signal to a user that that portion of text is a valid citation type. In some implementations, the computer readable indicator and the visual indicator may be the same. According to one aspect of the invention, the annotation module 730 may associate valid citation patterns according to entries in the index of citations maintained by the citation processing module 720. In some implementations, the annotation module 730 may associate a valid citation pattern for short cite forms to the particular citation pattern that was used to create it.

In some implementations, the annotation module 730 may associate a valid citation pattern for an id. recitation with the immediate preceding valid (non id.) citation pattern. In that way, valid citation patterns, including those for short cite forms and/or id. recitations, which correspond to a single authority (i.e., a common entry of the index) may be similarly handled, for example, when generating a list of citations. In one implementation, the same (or related) annotations may be used to associate valid citation patterns corresponding to a single authority.

Conversely, in other implementations, if the identified set of citation components is not determined to be a valid citation pattern, but otherwise, "appears" to correspond to a stored citation pattern (i.e., some, but not all of citation components of a particular citation pattern are satisfied), it may be flagged or otherwise identified by the annotation module 730 for error-handling.

According to one aspect of the invention, the annotation module 730 may insert a computer readable indicator into the document text to indicate an invalid citation pattern. When a list of citations is generated by the list generator module 750, these invalid citations patterns may be listed under the error category subheading in the list of citations. In another implementation, those portions of text may be copied to a separate file.

According to one aspect of the invention, the user may be presented with various options to configure the application for error-handling. In one implementation, the user may select one or more citation components for each type of citation that must be successfully identified for error-handling to occur. For example, with regard to the general legal case citation, the user may select that the citation components corresponding, for example, to the first party 803, versus 804, and the second party 805, must be identified before error-handling occurs. In this scenario, the combination of the aforementioned citation components likely corresponds to a General Legal Case citation pattern 902, but where the one or more other required citations components is missing and/or malformed. Once identified as being problematic, the user (or the application 700) may take remedial measures. Portions of text determined to be an invalid citation pattern, but which include the citation components selected by the user, may be copied to a file, and presented to the user (e.g., in a pop-up "window") such that the user may edit them.

In other implementations, the user may be provided with tips and/or suggestions as to how to fix or edit the citation and/or one or more citation components. For example, by knowing which citation components were not properly identified in the document text, the application may present the user with one or more rules from the Bluebook corresponding to those citation components. Other error-handling tools and techniques may also be used, such as fuzzy-logic, a dictionary feature, and/or a spell-checker function. Alternatively, invalid citation patterns may be simply ignored altogether.

According to one aspect of the invention, the action item module 740 allows the user to select various options and functions associated with each valid (and/or invalid) citation pattern. The options may be static, dynamic, or customized based on different citation types.

In one implementation, an information icon, which provides a drop-down action menu when the user clicks on or hovers over the icon, may be provided. The information icon may be associated with a computer readable indicator, such as a smart tag, that may be inserted by the annotation module 730. Various options may be presented to the user within the drop-down action menu, according to the type of citation associated therewith. Such actions may include, but are not limited to, an option to link to an external website or to a commercial electronic database or research service such as LexisNexis, Westlaw, FindLaw, or LoisLaw. The actual document (e.g., a case, a statute, an article, or other source) that the citation refers to may also be retrieved, and/or a related document. Depending of the type of citation, documents or information may be retrieved from different sources, for example, from free or proprietary services. In addition, legal professionals may be presented with an option to Shepardize the citation.

According to one aspect of the invention, the software application 700 may include a list generator module 750 to generate a list of the valid citation patterns identified in the electronic document. The list of citations may include, for example, a Table of Authorities ("TOA"), endnotes, a bibliography, a table, a chart, a list, or other summarizing feature for citations.

In one implementation, the list generator module 750 may use the annotations inserted into the document by the annotation module 740 to generate a list of citations and/or the index of citations maintained by the citation processing module 720. For example, a Table of Authorities (TOA) may be generated. The list generator module 750 may associate a particular category with one or more type of citations. In some implementations, the annotation module 730 may insert a computer readable indicator for a particular type of citation, which the list generator module 750 associates with a particular category of the TOA. The list generator module 750 may also rely on the index of citations maintained by the citation processing module 720 for referencing "full cite" forms (and/or "short cite" forms) for a particular citation when generating a list of citations. For example, the list generator module 750 may use the "full cite" form for a citation pattern when generating a list of citations.

In some implementations, although a particular citation pattern may include, for example, ten legal citation components, if that same citation pattern is included in a list of citations (e.g., a Table of Authorities), some of the citation components may be omitted from the list of citations, in keeping with general practice. By contrast, in the existing software applications, a programmer might have to add additional code to that portion of the program in order to accomplish the same task.

According to one aspect of the invention, the interface module 760 allows the software application to connect to various devices, as needed, to transmit and/or receive information and data there between. The interface module 760 may be configured to connect via the network 510 to the server 512, such as a third-party external server. A request to the electronic database or research service may be in the form of an electronic message to a third-party API (Application Programming Interface), for example, the LexisNexis Web Services Kit API. The request may be processed immediately by the service and a response message may be returned by the service. Returned documents or other results may be presented to the user by way of the interface display in an application, such as a research task pane within the document-processing software. In some implementations, interface module 760 may also provide a Uniform Resource Locator ("URL"), or other address for linking to a service or information.

Depending on the particular citation pattern, documents or other information may be retrieved from different sources, for example, from free or proprietary services. For example, many documents, such as legal cases and statutes may be available for downloading for free, for example, from a government website. Other documents, such as books, journal articles, newspapers, or other materials may only be available from a proprietary service or website (e.g., LexisNexis or Westlaw). By knowing a particular type of citation, the interface module 760 may connect to one or more services associated with that particular citation pattern. The interface module 760 may also include, for example, account information for one or more research or informational services, such as log-in and password data. Further, the interface module 760 may assign and maintain different account profiles for different users, including access to, and/or different rights with respect to each service.

In one implementation, legal professionals and their staff may perform research on legal citations recognized in a legal document and perform a verification to ensure that the citation is still considered "good law." This is known in the art as Shepardizing. The ability to verify and update a legal citation is central to effective case law research. The response may include requested information in the form of an XML document. Returned documents may be presented to the user by way of an interface module 760, for example in a separate element, such as a "window, distinct from the electronic document, a separate application, a separate document, or an element within the electronic document or software application. In one implementation, a research task pane within the document-processing software may be used.

Figure 11:
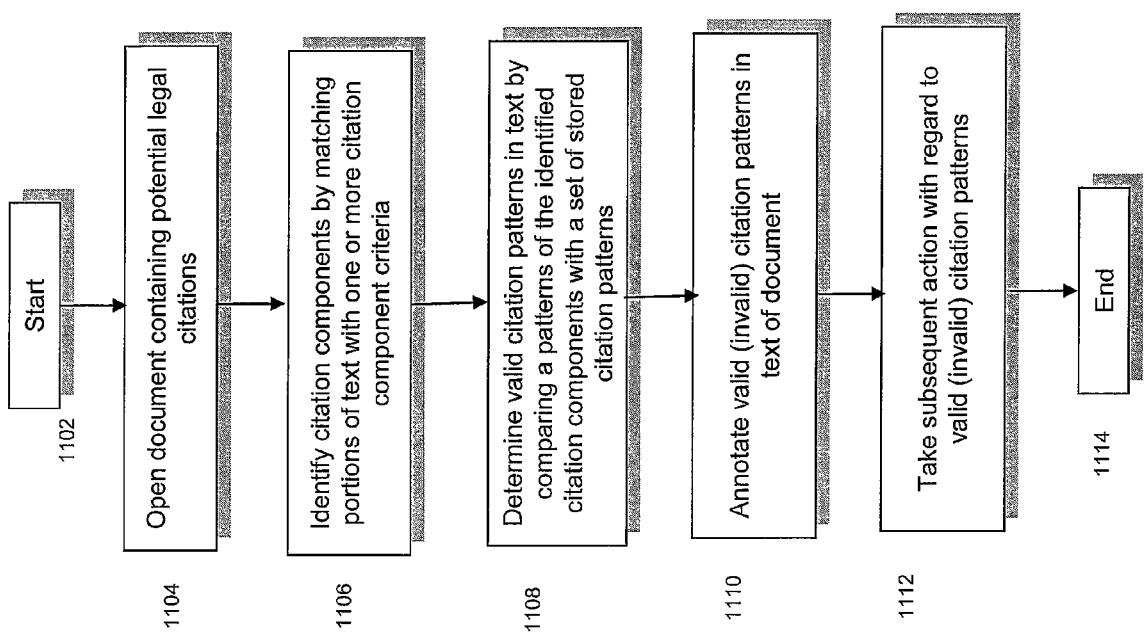
FIG. 11 illustrates a flowchart of processing operations for demonstrating how valid citation patterns may be determined within the text of an electronic document, according to one aspect of the invention.

FIG. 11 is an exemplary flowchart of processing operations illustrating how valid citation patterns may be determinate from text in an electronic document. Processing may commence in an operation 1102. The user may interact with the application through the graphical user interface module 705.

In an operation 1104, an electronic document containing legal citations is opened in an application. The electronic documents may comprise documents generated by any of a number of software applications (e.g., word processing applications, spreadsheet applications, or other software applications). For example, users may open an electronic document or create a new document from a template just as they would open any other electronic document. The opening and/or creating of the document may also be accomplished through a document management system, such as Hummingbird™, Interwoven™, Documentum™ or Worldox™.

In an operation 1106, citation components are identified in the document text by matching portions of the text with one or more citation component criteria. First, a set of citation patterns and citation components along with their associated sets of citation component criteria and may be retrieved from the storage module 710 and transferred (or copied) to memory 630 of computer 502 for faster processing. Next, the citation processing module 720 scans the document text. The document text may be initially compared against one or more sets of citation component criteria by the citation component identification module 724. In one implementation, a one-to-one comparison may be made using a simple Boolean operation. If a portion of text, matches a citation component criteria then that portion of text may be identified in memory 630 as a citation component, and may include information indicating the type of the citation component.

In an operation 1108, the citation component pattern matching module 726 analyses a pattern of the identified citation components (identified in operation 1106) by comparing the pattern to the set of stored citation patterns. The portions of text which are determined to be valid (and/or invalid) citation patterns may be stored in memory 630, and may include information indicating the type of the citation. As valid citation patterns are determined, they may be added to the index of citations maintained by the citation processing module 720. In addition, the short cite module 728 may automatically generate one or more citation patterns for short cite forms for valid citation patterns determined in the document text. The citation patterns for the short cite forms may be added to the set of stored citation patterns. The index of citations may store "full cite" and "short cite" forms for a valid citation pattern In some implementations, operations 1106 and 1108 may be performed in a simultaneous manner. In other implementations, operations 1106 and 1108 may be sequentially and/or iteratively performed.

In operation 1110, both valid (and/or invalid) citation patterns recognized in the document text in operation 1108 may be annotated. The annotation module 730 generates computer readable indicators and/or visual indicators corresponding to portions of text determined to be valid citation patterns. Different indicators may be provided depending on the type of citation. In operation 1112, subsequent actions may be taken by the user and/or the application 700 once valid (and/or invalid) citation patterns have been determined in the document. Subsequent actions may include generating a list of citations, performing research, error-handling and/or other options related to citations. The processing ends in operation 1114.

Figure 12:
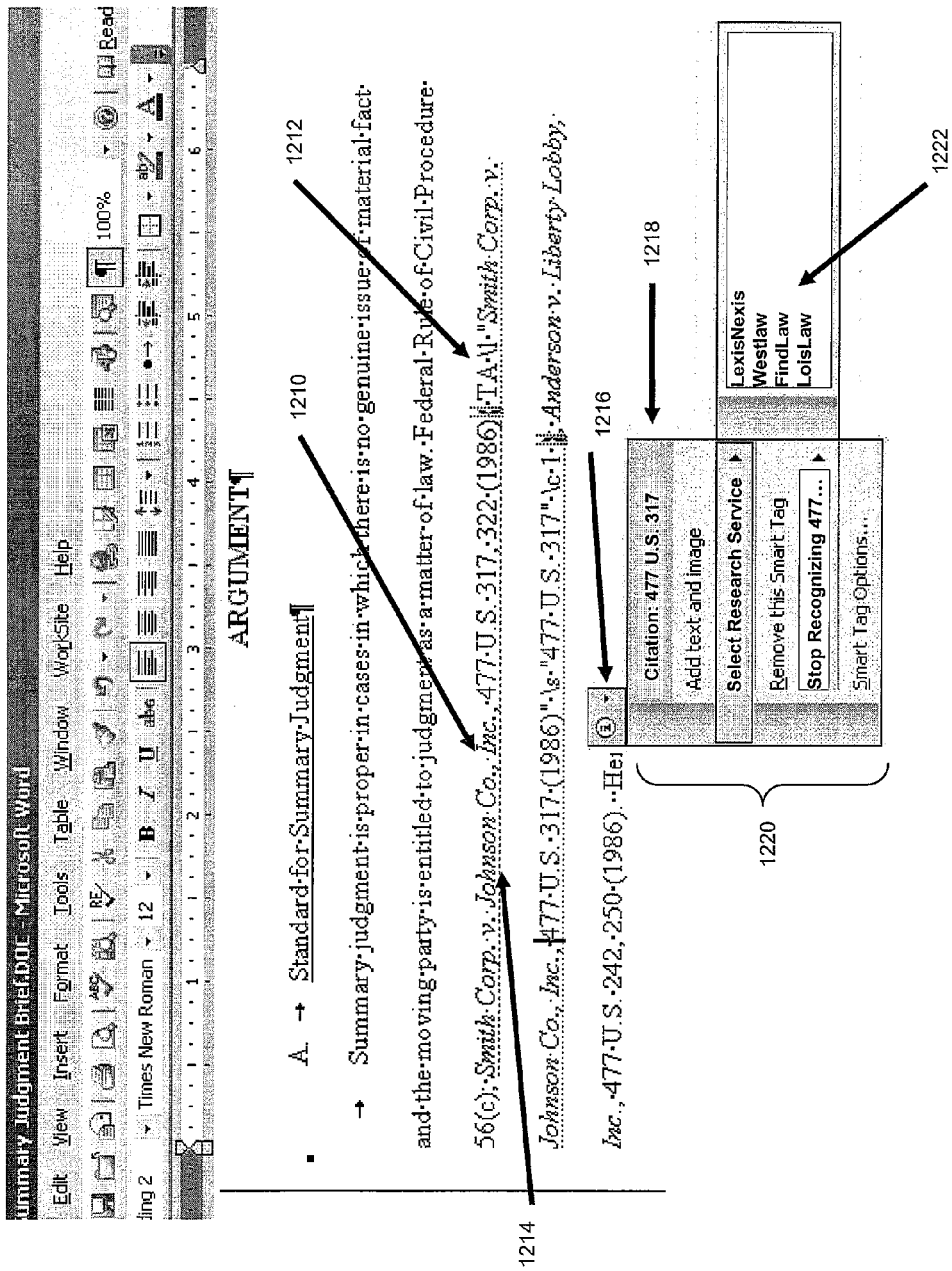
FIG. 12 illustrates an electronic document having valid citation patterns therein, according to one aspect of the invention.

FIG. 12 illustrates an electronic document, for example, a Microsoft Word® document including an exemplary legal case citation 1210. A computer readable indicator 1212, for example, a field code, may be inserted automatically immediately following the portion of text determined to a be a valid legal case citation patterns. Alternatively, or in addition to the field code 1212, another computer readable indicator, for example, a smart tag 1214 may be inserted into the text (indicated by a series of small dots under the text thereof).

In one implementation, when the user hovers the mouse pointer over the area of text defined by the smart tag 1214, an information icon 1216 may be displayed. By clicking on the information icon 1216 a drop-down action menu 1218 may be presented to the user. The action menu 1218 may include a list of options that the user may select, for example, using a mouse or other interface device, to execute with respect to the citation. Such actions 1220 may include, but are not limited to, an option to link to an external website or to a widely used commercial electronic database or research service 1222 such as LexisNexis, Westlaw, FindLaw, or LoisLaw.

In one implementation, a research task pane in a software application (e.g., Microsoft Word®) may be modified, for displaying information returned from the electronic database or research service along with the electronic document. For example, the active document pane and the research pane may be displayed in a side-by-side arrangement. Alternatively, the panes may presented in a tiled or cascaded arrangement. In one implementation, the results of Shepardizing a citation may be displayed in a research pane.

Figure 13:
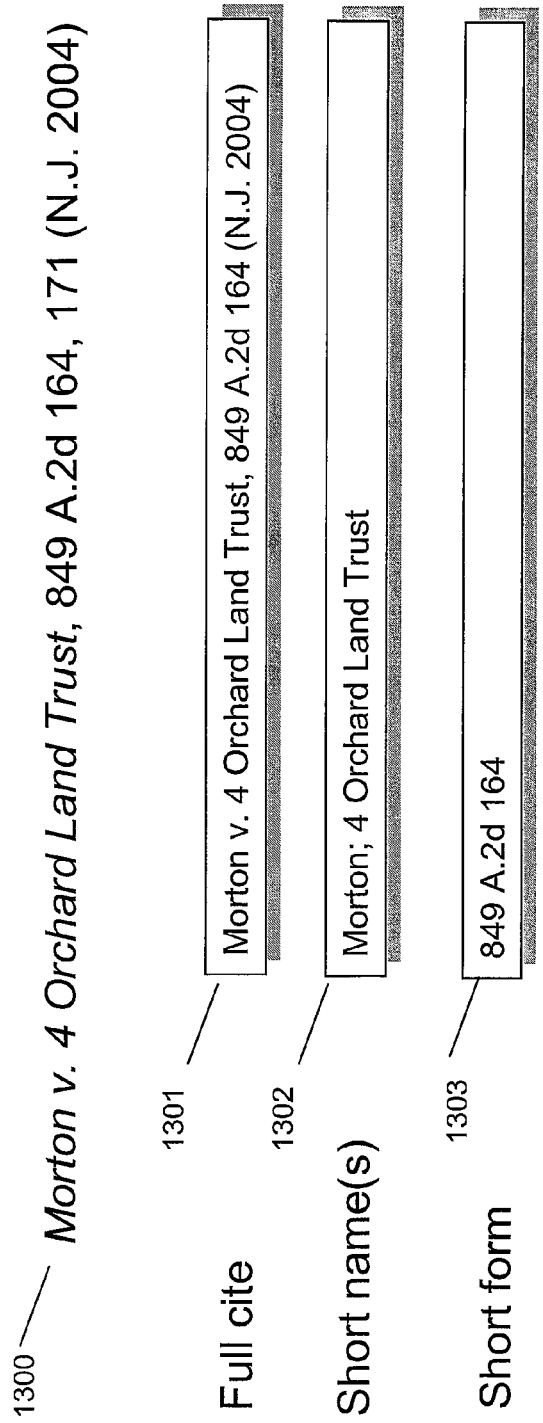
FIG. 13 illustrates an exemplary citation pattern in an index of valid citation patterns determined in the document text, along with the "full cite" and "short cite" forms, according to one aspect of the invention.

FIG. 13 illustrates an exemplary citation pattern 1300, which is a valid general legal case citation pattern 902 (that was determined by the citation component pattern matching module 726). The citation pattern 1300 corresponds to a particular authority that may be subsequently reference in the document, according to the Bluebook and other citation systems. According to one aspect of the invention, the citation processing module 720 may create an entry in the index of citations for valid citation patterns. In some implementation, the index of citations may include a "full cite" form and one or more "short cite" forms for each citation therein. In other implementations, the "full cite" and "short cite" forms may differ depending on the citation type.

The "full cite" may be generated from the actual values of the constituent citation components for a valid citation pattern In this instance, the full cite 1301 was generated from actual values of the citation components for the valid general legal case citation pattern 902 corresponding to the exemplary citation pattern 1300. In some implementations, the full cite form 1301 may omit certain citation components, according to the Bluebook or other citation systems. In this example, the pinpoint to page 171 (corresponding to the pinpoint citation pattern 812) has been omitted from the full cite 1301.

One or more citation patterns may be automatically generated from the short cite forms. According to the Bluebook and other citation systems, a general legal case, may have multiple short cite forms which may include an abbreviated or shortened name of the case ("short name") 1302 and an abbreviated or shortened citation of the case which refers to the reporter volume and reporter abbreviation, and one or more specific pages reference to ("short form") 1303. For example, the short name 1302 may be determined from actual values of the first party citation pattern 803 or the second party citation patterns 805 for citation pattern 1300. Generally, short names are underlined or italicized in the document text. In one implementation, the short cite module 728 may further determine a particular type of formatting (e.g., font) from actual values of citation components for short cite forms. In some implementations, the short cite module 728 may also exclude certain terms, such as *In re, Ex parte* Matter of, et al. or other procedural phrases, as well as commonly used litigant names, such as, State or U.S, according to the Bluebook and/or other citation systems. In addition, according to the California Style Manual and/or other citation systems, an author might indicate a specific short cite case name to use by enclosing the short name in parentheses, usually preceded by the word "hereafter," when first introducing the authority in the document. In one implementation, the short cite module 728 may simply use the explicit short cite term(s) occurring in parentheses and/or occurring immediately "hereafter," as the short name.

The short form 1303 may be determined from the reporter volume 808, reporter abbreviation 809, and/or initial page 804 citation components. In contrast to the general legal case citation pattern 902, which is used to determine valid citation patterns for any legal case in the document text, the short name 1302 and short form 1303 are specific to a particular citation pattern (e.g., citation pattern 1300) determined in the document text.

Figure 14A:
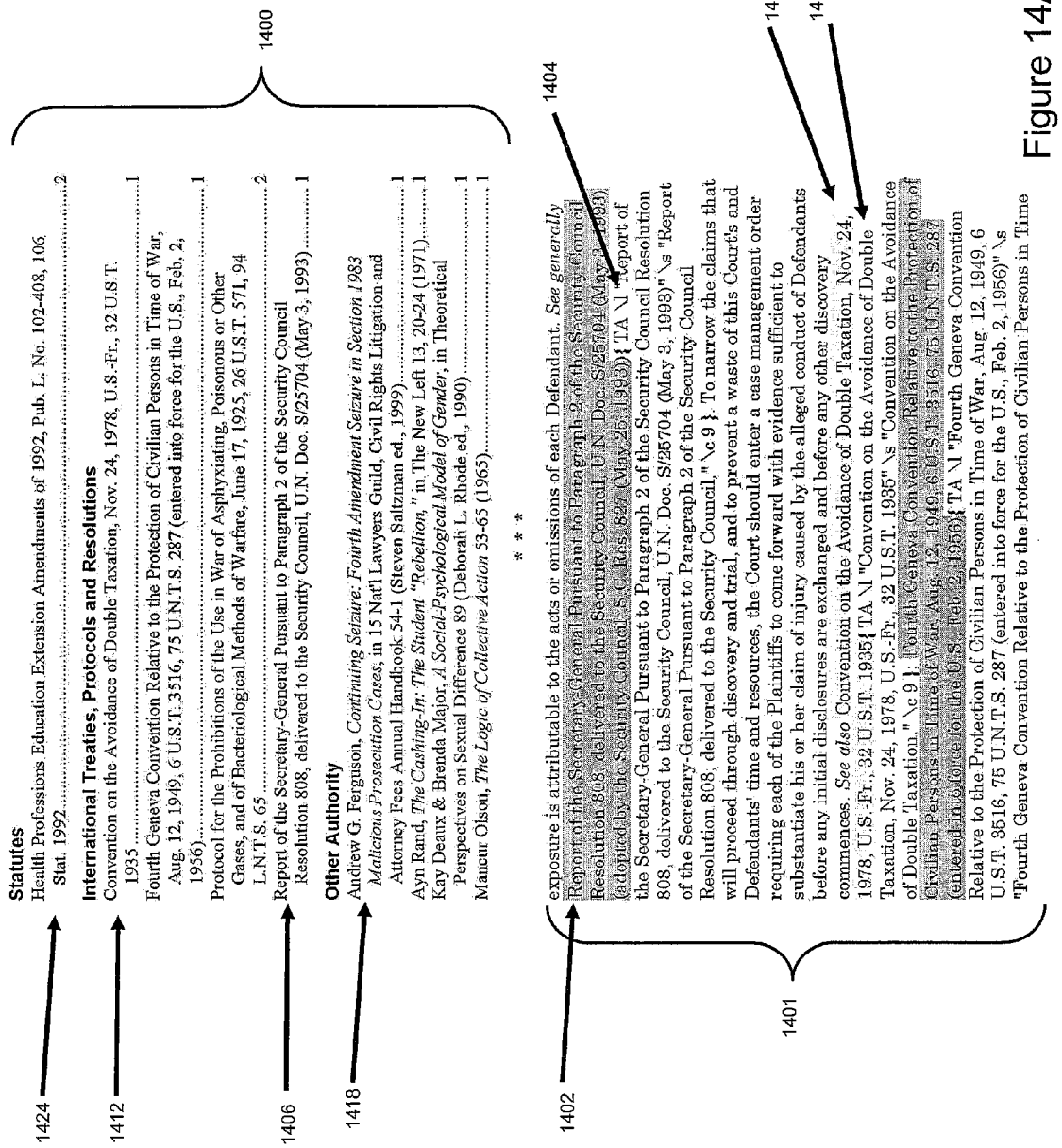

FIGS. 14A-14B illustrate an exemplary list of citations 1400 created using the list generator module 750 of the software application 700, according to one aspect of the invention. According to one implementation, the list of citations may be a Table of Authorities (TOA) 1400. In this scenario, the TOA 1400 was generated for the document text 1401, which is the same document text used in the comparative examples shown in FIGS. 2-4 (201, 401).

Citation 1402 is to the United Nations document. Element 1404 is a computer readable indicator inserted by the annotation module 730. In this implementation, the computer readable codes inserted by the annotation module 730 were Microsoft Word® TA (Table of Authorities Entry) field codes. Referring to citation 1406, the complete citation has been correctly recognized and inserted into the TOA 1400 under the category subheading "International Treaties, Protocols and Resolutions." The TA field code 1404 includes an indicia ("\c9") which may be associated with the category subheading "International Treaties, Protocols and Resolutions" in the TOA 1400 by the annotation module 730 and the list generator module 750. Other field codes may include different indicia, which correspond to different categories in the TOA 1400.

In addition, citation 1408 is to the treaty to which the United States is a party. Field Code 1410 was inserted by the annotation module 730. A review of the TOA 1400 shows that the application 700 was successful in identifying the full name of the citation 1408 and added it as citation 1412 under the correct category in the TOA 1400.

Citation 1414 is to an individual shorter work within a volume of collected works by various authors. Field Code 1416 was inserted by the annotation module 730. Citation 1418 in the TOA 1400 shows that the application 700 was successful in recognizing the complete citation.

Also, citation 1420 is to a Federal Law. This citation contains a rather long title. Field code 1422 was inserted by the annotation module 730. Referring to citation 1424 in TOA 1400 indicates that the application has accurately recognized the complete citation.

Figure 4A:
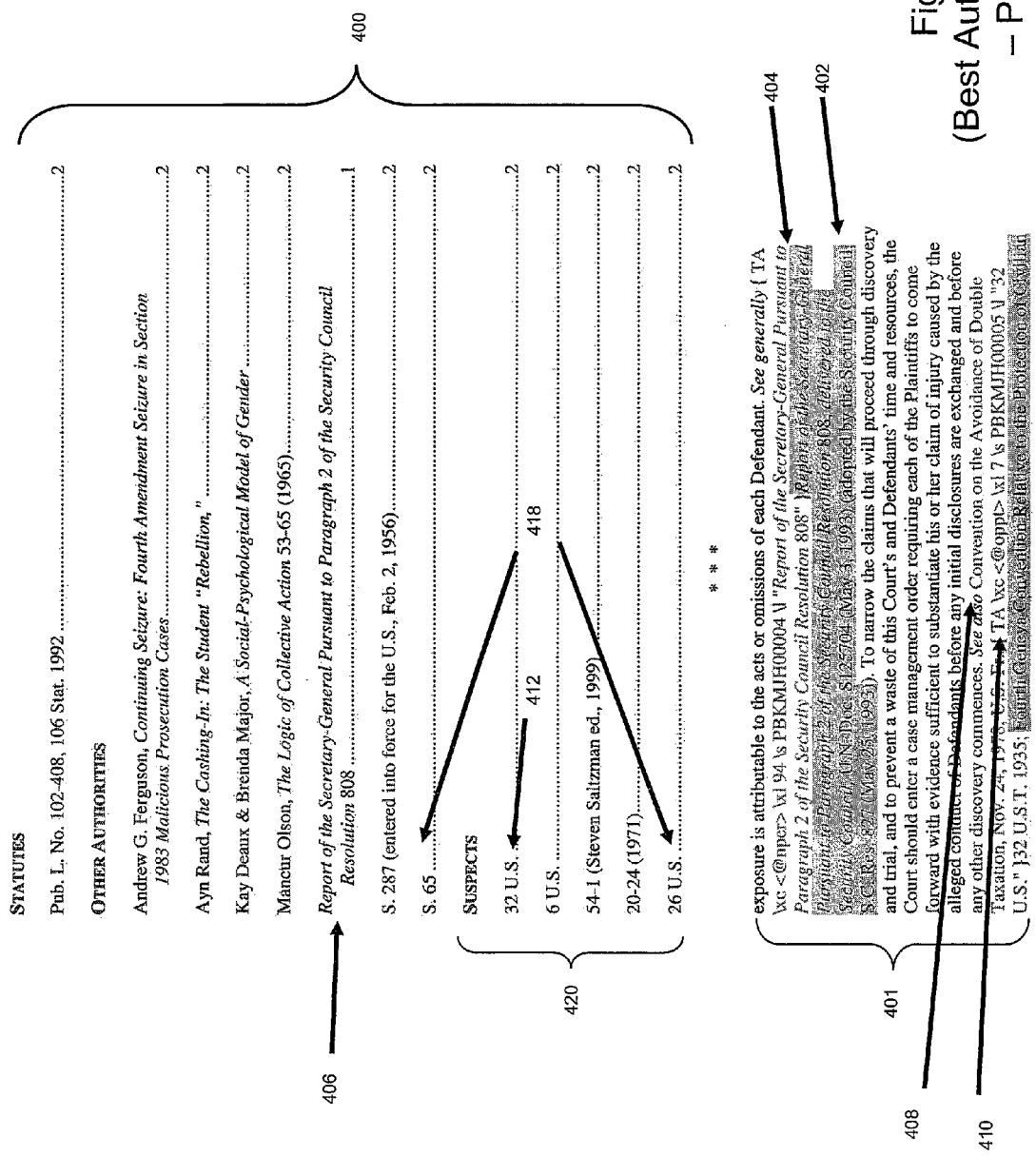

A review of FIGS. 14A-14B, illustrates that the application has successfully recognized all of the citations patterns corresponding to actual citations contained in the exemplary document text (many of which were ignored or incorrectly identified by the existing software applications in FIGS. 2-4). By accurately finding and marking valid legal citation patterns in a document for example, a legal brief, reduces the task of manually marking the document, thereby enabling the legal professionals and their staff to focus on other more urgent tasks.

By contrast to the existing software applications illustrated in FIGS. 2-4, the application may achieve near pinpoint accuracy in recognizing legal citation patterns in document text, especially with respect to non-legal citation pattern, such as books, periodicals, magazines, newspapers and other citations where the starting point of such citations may be nebulous and difficult to determine through existing software applications. The application may advantageously perform these actions without any intervention on the part of the user. Thus, the system may require less human intervention than existing software applications to assist in finding and validating legal citations.

As can be appreciated from the foregoing, implementations of the application provide for a more effective and efficient method of validating legal citations. The application is able to determine relevant portions of document text faster or more accurately. In the existing software applications, the process of validating a legal citation may involve long and complex code. By contrast, using a set of citation patterns, only a minimum number of comparisons may be needed to validate a legal citation.

Moreover, long and complex code associated with keyword searching algorithms may be eliminated and updates to a citation pattern may be made faster and more manageable. Changes may only need to occur to an individual citation component and/or citation pattern instead of multiple lines of code. Thus, the application may be able to determine relevant portions of document text much more efficiently.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the disclosure as come within known or customary practice in the art to which the invention pertains, and as may be applied to the essential features hereinbefore set forth and followed in the spirit and scope of the appended claims.

What is claimed is:

1. A method for determining valid citation patterns in text within an electronic document using a processor, the method comprising:
   accessing, from a memory, at least one citation pattern, wherein each citation pattern includes a set of citation components which together define a predetermined pattern of citation components, each citation component associated with a set of citation component criteria;
   comparing text in the electronic document with the predetermined pattern of the citation components corresponding to the at least one citation pattern; and
   determining valid citation patterns in the text by identifying the predetermined pattern of citation components corresponding to the at least one citation pattern in the text.

2. The method according to claim 1, further comprising:
   automatically generating one or more citation patterns for short cite forms for a valid citation pattern determined in the document text.

3. The method according to claim 1, further comprising:
generating a list of citations in the electronic document for the valid citation patterns.

4. The method according to claim 3, where the list of citations includes one or more categories corresponding to one or more citation patterns.

5. The method according to claim 1, further comprising:
maintaining an index of valid citation patterns determined in the document text; wherein each entry in the index is to an independent authority.

6. The method according to claim 5, wherein each entry in the index includes a full cite form and one or more short cite forms for that authority.

7. The method according to claim 1, wherein comparing includes performing one-to-one pattern matching.

8. The method according to claim 1, wherein the citation components comprise one or more of the following: a signal, a first party, a versus, a docket number, a skeletal citation, a reporter volume number, a reporter abbreviation, an initial page, a publishing service, an initial subdivision, an Internet citation, a pinpoint, a reporter table, a first parallel citation, a first parallel pinpoint, a second parallel citation, a second parallel pinpoint, an early American citation, or a court and date of decision.

9. The method according to claim 1, further comprising:
inserting an annotation into the electronic document corresponding to text determined to be a valid citation pattern.

10. The method according to claim 9, wherein the annotation is a computer readable indicator or a visual indicator, an informational icon associated with an action menu, or a combination thereof.

11. The method according to claim 1, further comprising:
inserting an annotation into the electronic document corresponding to text not determined to be a valid citation pattern, wherein said text includes one or more identified citation components.

12. The method according to claim 11, further comprising:
performing one or more of the following: copying said text not determined to be a valid citation pattern to a file, inserting annotations into the said text not determined to be a valid citation pattern, or placing said text not determined to be a valid citation pattern into an error category within a list of citations.

13. The method according to claim 1, further comprising:
determining a type of citation for each of the valid citation patterns.

14. The method according to claim 13, further comprising:
retrieving a document or information from a service for a valid citation pattern based on the type of citation.

15. The method according to claim 1, wherein one or more of: at least one citation pattern, sets of citation components, or set of citation component criteria, are regular expressions.

16. The method according to claim 1, wherein one or more of the citation components are optional or supplemental, and need not be identified in the text for a valid citation pattern to be determined.

17. A computer readable medium having computer-implemented instructions executable on a processor for determining valid citation patterns in text of an electronic document, the instructions comprising:
a storage access module configured to access, from a memory, at least one citation pattern, wherein each citation pattern includes a set of citation components which together define a predetermined pattern of citation components, each citation component associated with a citation component criteria; and
a citation processing module configured to:
(i) compare text in the electronic document with the predetermined pattern of the citation components corresponding to the at least one citation pattern; and
(ii) determine valid citation patterns in the text by identifying the predetermined pattern of citation components corresponding to the at least one citation pattern in the text.

18. The medium of claim 17, the instructions further comprising:
a citation list generator module that generates a list of valid citation patterns in the document.

19. The medium of claim 17, the instructions further comprising:
an action item module that provides at least one option to the user related to a valid citation pattern; and
an interface module that connects to a service for retrieving one or both of documents or information related to the valid citation pattern.

20. The medium of claim 17, the instructions further comprising:
an annotation module that inserts an annotation into the electronic document corresponding to text determined to be a valid citation pattern.

21. The medium of claim 17, the instructions further comprising:
a graphical user interface module configured to display valid citation patterns in the electronic document in a graphical user interface of a display device.

* * * * *